United States Patent
Kashiwagi et al.

(10) Patent No.: US 12,051,804 B2
(45) Date of Patent: Jul. 30, 2024

(54) POSITIVE ELECTRODE ACTIVE MATERIAL PARTICLES FOR NON-AQUEOUS ELECTROLYTE SECONDARY BATTERIES AND METHOD FOR PRODUCING SAME, AND NON-AQUEOUS ELECTROLYTE SECONDARY BATTERY

(71) Applicant: BASF TODA BATTERY MATERIALS LLC, Tokyo (JP)

(72) Inventors: Junji Kashiwagi, Sanyoonoda (JP); Daisuke Nishikawa, Sanyoonoda (JP); Satoshi Nakamura, Sanyoonoda (JP); Kazutoshi Ishizaki, Sanyoonoda (JP); Kazumichi Koga, Sanyoonoda (JP); Hiroyoshi Noguchi, Sanyoonoda (JP); Takahiko Sugihara, Sanyoonoda (JP); Kazutoshi Matsumoto, Matsudo (JP)

(73) Assignee: BASF TODA BATTERY MATERIALS LLC, Tokyo (JP)

(*) Notice: Subject to any disclaimer, the term of this patent is extended or adjusted under 35 U.S.C. 154(b) by 899 days.

(21) Appl. No.: 17/020,136

(22) Filed: Sep. 14, 2020

(65) Prior Publication Data
US 2020/0411861 A1    Dec. 31, 2020

Related U.S. Application Data
(63) Continuation of application No. PCT/JP2019/010250, filed on Mar. 13, 2019.

(30) Foreign Application Priority Data

Mar. 15, 2018  (JP) ................. 2018-048359
Mar. 12, 2019  (JP) ................. 2019-045048

(51) Int. Cl.
| | | |
|---|---|---|
| H01M 4/525 | (2010.01) | |
| H01M 4/04 | (2006.01) | |
| H01M 4/505 | (2010.01) | |
| H01M 10/04 | (2006.01) | |
| H01M 10/0525 | (2010.01) | |
| H01M 4/02 | (2006.01) | |

(52) U.S. Cl.
CPC ......... H01M 4/525 (2013.01); H01M 4/0471 (2013.01); H01M 4/505 (2013.01); H01M 10/0427 (2013.01); H01M 10/0525 (2013.01); H01M 2004/028 (2013.01)

(58) Field of Classification Search
CPC .... H01M 4/525; H01M 4/0471; H01M 4/505; H01M 10/0427; H01M 10/0525; H01M 2004/028; H01M 4/131; C01P 2002/52; C01P 2002/60; C01P 2002/88; C01P 2004/60; C01P 2004/61; C01P 2006/40; C01G 53/40; C01G 53/42; C01G 53/50; Y02P 70/50; Y02E 60/10
See application file for complete search history.

(56) References Cited

U.S. PATENT DOCUMENTS

| | | | |
|---|---|---|---|
| 9,819,019 B2 | 11/2017 | Fujiki et al. | |
| 2002/0192552 A1 | 12/2002 | Lampe-Onnerud et al. | |
| 2002/0192556 A1 | 12/2002 | Lampe-Onnerud et al. | |
| 2003/0010631 A1 | 1/2003 | Anzai | |
| 2004/0265216 A1 | 12/2004 | Nazri et al. | |
| 2009/0121179 A1 | 5/2009 | Shi | |
| 2011/0143204 A1 | 6/2011 | Paik et al. | |
| 2013/0252085 A1 | 9/2013 | Nelson et al. | |
| 2015/0280211 A1* | 10/2015 | Kikuya ................. | C01G 53/50 429/223 |
| 2017/0110718 A1 | 4/2017 | Nelson et al. | |
| 2017/0176543 A1* | 6/2017 | Lee ...................... | G01R 31/388 |
| 2017/0338473 A1* | 11/2017 | Cho ..................... | H01M 4/366 |
| 2018/0316003 A1* | 11/2018 | Horikawa ........... | H01M 4/1391 |
| 2019/0027782 A1* | 1/2019 | Tamura ................ | H01M 4/525 |
| 2019/0165372 A1* | 5/2019 | Sugiura ................ | H01M 4/505 |

FOREIGN PATENT DOCUMENTS

| | | |
|---|---|---|
| JP | 2004-531034 A | 10/2004 |
| JP | 2004-533104 A | 10/2004 |
| JP | 3858699 B2 | 9/2006 |
| JP | 2011-023335 A | 2/2011 |
| JP | 4695831 B2 | 3/2011 |
| JP | 2011-192404 A | 9/2011 |
| JP | 2013-254639 A | 12/2013 |
| JP | 2017-084676 A | 5/2017 |

OTHER PUBLICATIONS

MacNeil, D.D. et al., "The Reaction of Charged Cathodes with Nonaqueous Solvents and Electrolytes I. Li0.5CoO2," Journal of the Electrochemical Society, 148(11), A1205-A1210 (2001).
Pouillerie, C. et al., "Effect of magnesium substitution on the cycling behavior of lithium nickel cobalt oxide,"Journal of Power Sources, 96, (2001), 293-302.
International Search Report for PCT/JP2019/010250 mailed May 28, 2019 with English translation, 3 pages.
Supplemental European Search Report for EP application No. 19768336.0 dated Dec. 21, 2021, 7 pages.
Office Action for Japanese Patent Application No. 2019-045048 mailed May 11, 2021, with English translation, 8 pages.

* cited by examiner

*Primary Examiner* — Muhammad S Siddiquee
(74) *Attorney, Agent, or Firm* — Armstrong Teasdale LLP

(57) ABSTRACT

Excellent thermal stability in addition to excellent cycle property with maintaining a sufficient battery capacity is shown by positive electrode active material particles having a layered rock salt structure, represented by the compositional formula: $(Li_yX_e)(Ni_aCo_bX_cZ_d)O_2$, in the compositional formula: X is a divalent metallic element capable of substituting for Li-site; Z is a metallic element containing at least Al and/or Mn, other than X; $0.93 \leq y \leq 1.15$; $0.82 \leq a < 1.00$; $0 \leq b \leq 0.12$; $0.001 \leq c+e \leq 0.040$; $0 \leq d \leq 0.10$; and $a+b+c+d=1$.

3 Claims, 3 Drawing Sheets

Normal

Substitution with Mg

POSITIVE ELECTRODE ACTIVE MATERIAL PARTICLES FOR NON-AQUEOUS ELECTROLYTE SECONDARY BATTERIES AND METHOD FOR PRODUCING SAME, AND NON-AQUEOUS ELECTROLYTE SECONDARY BATTERY

CROSS-REFERENCE TO RELATED APPLICATION

This application is a Continuation of International Application No. PCT/JP2019/010250, filed on Mar. 13, 2019, which in turn claims the benefit of Japanese Patent Application No. 2018-048359, filed on Mar. 15, 2018, and Japanese Patent Application No. 2019-045048, filed on Mar. 12, 2019, the disclosures of which Applications are incorporated by reference herein.

BACKGROUND

Field

The present invention relates to: positive electrode active material particles having a layered rock salt structure for non-aqueous electrolyte secondary batteries showing excellent thermal stability in addition to excellent structural stability, little resistance increase, and excellent cycle property with maintaining a sufficient battery capacity; methods for producing the same; and non-aqueous electrolyte secondary batteries.

Description of the Related Art

In recent years, portable and cordless electronic devices such as mobile phones and personal computers have been rapidly spread. As a driving power source for these electronic devices, there are non-aqueous secondary batteries having a small size, a light weight, and a high energy density. Among them, lithium ion secondary batteries having advantages, such as a high charge/discharge capacity in which lithium cobalt (III) oxide or lithium nickel oxide is used as a positive electrode, are widely used.

Lithium cobalt (III) oxide is an excellent material showing a high voltage and a high battery capacity and is essential to a positive electrode material for small electronic devices. However, there is a problem. Lithium cobalt (III) oxide takes a high cost because a raw material of lithium cobalt (III) oxide is a cobalt compound which is rare and expensive.

So in recent years, there have been energetically researched: ternary positive electrode material particles (basic composition: $Li(NiCoMn)O_2$) having a layered rock salt structure and being a solid solution of Ni, Co, and Mn which are excellent in versatility; and lithium-nickel composite oxides (basic composition: $Li(NiCoAl)O_2$) in which Al has been introduced into lithium nickel oxide and an amount of cobalt has been reduced.

These positive electrode materials have a high charge/discharge capacity as well as a high battery voltage as with lithium-cobalt composite oxides. Therefore, these positive electrode materials are expected as materials which can expand the scope of devices to which lithium ion secondary batteries are applied, such as electric automobiles or stationary storage batteries, and are further energetically researched and developed.

However, lithium ion secondary batteries are generally pointed out for disadvantages: the battery capacity is gradually reduced due to a cycle operation in which charge/discharge is repeated; and the battery capacity is reduced due to storage with charged state under a high temperature environment. It is considered these disadvantages are caused because of a change of crystal structure and/or an expansion/contraction occurs in the positive electrode materials having a layered rock salt structure due to repeat of charge/discharge or charged state. In addition, the positive electrode materials having a layered rock salt structure in which Ni is contained as a base element are inferior to lithium-cobalt (III) oxide and lithium-manganese oxide in thermal stability. In comparison with these oxides, the materials release oxygen with structure thereof being damaged to react with an electrolytic solution at a lower temperature. As a result, the materials cause so-called thermorunaway, and firing and the like in secondary batteries occurs.

In order to achieve high stability in lithium-ion secondary batteries, it is considered, in particular, prevention of destabilization of crystal structure in, for example, the above lithium-nickel composite oxide is significant. As methods for the prevention, there have been adopted: a method for controlling compositional balance, crystallite size, and particle size distribution; a method for controlling a calcination temperature to give powder; a method for strengthening bonding power in crystal structure by adding heteroelements thereto; and a method for preventing damage of structure due to surface treatment and reaction with an electrolytic solution.

From disclosures of "The Reaction of Charged Cathodes with Nonaqueous Solvents and Electrolytes I. $Li_{0.5}CoO_2$", D. D. MacNeila and J. R. Dahn, Journal of The Electrochemical Society, 148(11), A1205-A1210 (2001), heat generation in a cell at a high temperature is mainly caused by oxidization heat of an electrolytic solution due to oxygen generated by decomposition of a positive electrode active material. Therefore, it is important to restrain generation of oxygen due to improvement of thermal stability of the positive electrode active material.

For example, Japanese Patent No. 3858699 discloses a lithium-nickel composite oxide having a basic composition of $LiNiO_2$ and a hexagonal layered rock salt structure. There is also disclosed: a part of Li-site and a part of Ni-site are substituted with Mg in the lithium-nickel composite oxide; Mg having substituted for Li-site plays a prevention role in transfer of Ni from Metal-site to Li-site with charged state in which Li is desorbed from crystal structure when the lithium-nickel composite oxide is applied for batteries; and the crystal structure is stably maintained and internal resistance increase is restrained also during storage at a high temperature with highly charged state.

Japanese Laid-Open Patent Publication No. 2011-023335 discloses a lithium-containing composite oxide having a basic composition of $LiMO_2$ in which M is an elemental group consisting of four or more elements containing at least three elements selected from Co, Mn, Al, Mg, and Ti; and Ni. There is also disclosed: expansion/contraction rate of crystal structure due to removed/inserted Li during charge/discharge can be lowered by substituting Metal-site and Li-site with Mg in addition to substitution of the Metal-site with Al in the lithium-containing composite oxide; and, as a result, cycle property can be improved because irreversible reaction can be mitigated.

Japanese Laid-Open Patent Publication No. 2017-084676 discloses a positive electrode active material for lithium-ion batteries, having: a basic composition of $LiNiCoMnO_2$ particles which are ternary composite oxides; and Li—Zr—W—O oxides on surface thereof. There is also disclosed, for example, a method for covering the above ternary composite oxide with separately prepared fine particles of the Li—Zr—W—O oxide by a dry process after synthesis of the ternary composite oxides of LiNiCoMnO$_2$, as a method for surface treating the above particles of LiNiCoMnO$_2$ with the Li—Zr—W—O oxide; and protective coatings are formed by such surface treatment to prevent reaction of a positive electrode material with an electrolytic solution.

However, in the lithium-nickel composite oxide disclosed in Japanese Patent No. 3858699, an amount of Mg substituting for a part of Li-site and a part of Ni-site is excessively large and, as a result, an amount of Li in the Li-site is relatively reduced and an amount of Ni which contributes to battery capacity in Metal-site is reduced. Thus, although the lithium-nickel composite oxide shows high stability of the crystal structure and good cycle property, the battery capacity becomes to be low and improvement of thermal stability is not considered, so that the lithium-nickel composite oxide cannot have battery properties sufficient for practical use.

As to the lithium-containing composite oxide disclosed in Japanese Laid-Open Patent Publication No. 2011-023335, it has been attempted to improve battery capacity, stability, and the cycle property by substituting Ni-site and/or Li-site with Al and/or Mg, and by adjusting an average valence of Ni to +2.5-+2.9. However, the cycle property is insufficient for practical use, and improvement of properties at a high temperature and thermal stability is not considered and cannot be confirmed.

As to the positive electrode active material for lithium-ion batteries disclosed in Japanese Laid-Open Patent Publication No. 2017-084676, the positive electrode material is protected so as not to react with the electrolytic solution by coating a surface layer of the ternary composite oxide with the fine particles of the Li—Zr—W—O oxide. However, the ternary composite oxide itself, which becomes to be a core material, is not subjected to specific treatments. Therefore, although improvement of cycle property and storage property at a high temperature is considered, damage of crystal structure at a high temperature and thermal stability are not considered and cannot be confirmed.

Thus, there have not been proposed yet: materials showing all properties which are currently most demanded as a positive electrode active material for non-aqueous electrolyte secondary batteries, that is, materials showing excellent thermal stability in addition to excellent cycle property and storage property at a high temperature with maintaining a sufficient battery capacity; and methods for producing the materials.

SUMMARY

The present inventions have been completed in view of conventional problems mentioned above. An object of the present invention is to provide: a positive electrode active material showing excellent thermal stability in addition to excellent cycle property with maintaining a sufficient battery capacity; and a method for producing the material. A further object of the present invention is to provide a non-aqueous electrolyte secondary battery containing such positive electrode active material.

In order to achieve the above objects, positive electrode active material particles of the present invention are composed of a layered lithium-composite oxide containing: at least Li and Ni; Co as needed; and surely a divalent metallic element capable of substituting for Li-site. The layered lithium-composite oxide has Metal-site containing a large amount of Ni and is indexed in a space group R-3m by an X-ray diffraction (XRD).

The positive electrode active material particles for non-aqueous electrolyte secondary batteries, according to the present invention, have a layered rock salt structure, and are positive electrode active material particles represented by the compositional formula:

$(Li_\gamma X_e)(Ni_a Co_b X_c Z_d)O_2$ in the compositional formula: X is a divalent metallic element capable of substituting for Li-site; Z is a metallic element containing at least Al and/or Mn, other than X; $0.93 \leq \gamma \leq 1.15$; $0.82 \leq a < 1.00$; $0 \leq b \leq 0.12$; $0.001 \leq c+e \leq 0.040$; $0 \leq d \leq 0.10$; and $a+b+c+d=1$.

The method for producing positive electrode active material particles, according to the present invention, is a method for producing the positive electrode active material particles for non-aqueous electrolyte secondary batteries, represented by the compositional formula:

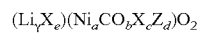
$(Li_\gamma X_e)(Ni_a Co_b X_c Z_d)O_2$ in the compositional formula: X is a divalent metallic element capable of substituting for Li-site; Z is a metallic element containing at least Al and/or Mn, other than X; $0.93 \leq \gamma \leq 1.15$; $0.82 \leq a < 1.00$; $0 \leq b \leq 0.12$; $0.001 \leq c+e \leq 0.040$; $0 \leq d \leq 0.10$; and $a+b+c+d=1$, and includes:

a step (I) including in this order
  synthesizing of a precursor compound by coprecipitating
    an aqueous solution containing an aqueous solution of a nickel compound, an optional aqueous solution of a cobalt compound, and an optional aqueous solution of a metallic element Z compound, and
    an aqueous solution of a divalent metallic element X compound, which is capable of substituting for Li-site
    in a wet type reaction by using an alkaline aqueous solution,
  washing with water and drying of the precursor compound,
  mixing of a lithium compound and the precursor compound at a prescribed ratio to prepare a mixture, and
  calcinating of the mixture under an oxidizing atmosphere at 650-850° C. to prepare a layered lithium-composite oxide; or
a step (II) including in this order
  synthesizing of a precursor compound by coprecipitating an aqueous solution containing an aqueous solution of a nickel compound, an optional aqueous solution of a cobalt compound, and an optional aqueous solution of a metallic element Z compound in a wet type reaction by using an alkaline aqueous solution,
  washing with water and drying of the precursor compound,
  mixing of a lithium compound, the precursor compound, and a divalent metallic element X compound, which is capable of substituting for Li-site, at a prescribed ratio to prepare a mixture, and
  calcinating of the mixture under an oxidizing atmosphere at 650-850° C. to prepare a layered lithium-composite oxide, wherein
when the step (I) or the step (II) is performed, an amount of the divalent metallic element X capable of substituting for Li-site is adjusted to 0.1-4.0 mol % relative to a total amount of Ni, optional Co, the divalent metallic element X, and an optional metallic element Z.

The non-aqueous electrolyte secondary battery according to the present invention is a non-aqueous electrolyte secondary battery including a positive electrode which contains the positive electrode active material particles for non-aqueous electrolyte secondary batteries.

In accordance with the present invention, there can be provided positive electrode active material particles surely showing excellent structural stability with maintaining a sufficient battery capacity when used for a lithium-ion secondary battery, and also showing excellent thermal stability in addition to excellent cycle property and little resistance increase after load characteristics, which are suitable as a positive electrode active material for non-aqueous electrolyte secondary batteries.

BRIEF DESCRIPTION OF THE DRAWINGS

This and other objects and features of the present invention will become clear from the following description, taken in conjunction with the exemplary embodiments with reference to the accompanied drawings in which:

in FIG. 1;

DETAILED DESCRIPTION

Figure 1:
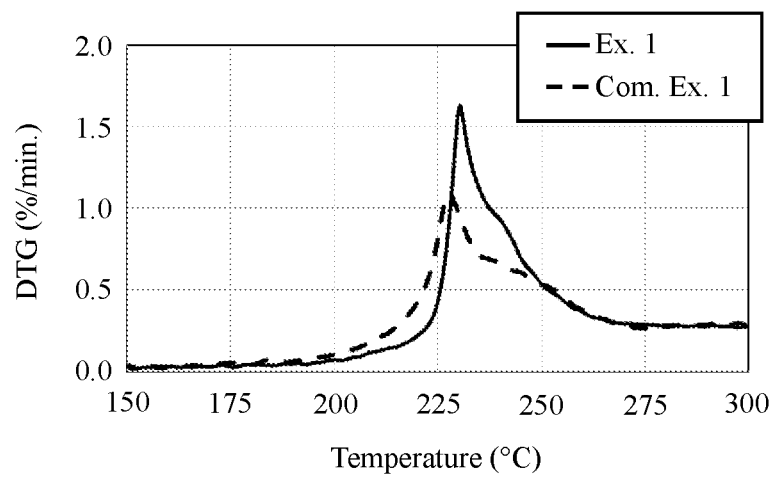
FIG. 1 shows a graph (DTG curve) of which horizontal axis is a temperature "T" and vertical axis is a value "DTG" (heat generation rate) obtained by differentiating weight change "TG" by time, based on the results of a thermogravimetry differential thermal analysis for the positive electrode active material particles in each of Example 1 and Comparative Example 1.

Hereinafter, embodiments for implementing the present invention are described. The following descriptions of preferred embodiments are merely essential examples, and do not intend to limit the present invention, a method for applying the same, and a use of the same.

<Positive Electrode Active Material Particles>

The positive electrode active material particles for non-aqueous electrolyte secondary batteries, according to the present invention, will first be described.

The positive electrode active material particles according to the present invention have a layered rock salt structure, can be indexed in the space group R-3m, and are represented by the compositional formula:

$(Li_\gamma X_e)(Ni_a Co_b X_c Z_d)O_2$ in the compositional formula: X is a divalent metallic element capable of substituting for Li-site; Z is a metallic element containing at least Al and/or Mn, other than X; $0.93 \leq \gamma \leq 1.15$; $0.82 \leq a < 1.00$; $0 \leq b \leq 0.12$; $0.001 \leq c+e \leq 0.040$; $0 \leq d \leq 0.10$; and $a+b+c+d=1$.

An amount of Li, represented by "$\gamma$", in the positive electrode active material particles according to the present invention, that is, a molar ratio of Li to metallic elements "Li/(Ni+optional Co+metallic element X existing in Metal-site+optional metallic element Z)" is $0.93 \leq \gamma \leq 1.15$, preferably $0.94 \leq \gamma \leq 1.12$, more preferably $0.95 \leq \gamma \leq 1.09$, and most preferably $0.95 \leq \gamma \leq 1.05$.

When the amount of Li is less than the lower limit, an amount of divalent Ni mixing into Li-site of the layered lithium-composite oxide increases, that is, a cation mixing amount increases and, as a result, properties of the positive electrode active material particles are lowered. When the amount of Li is more than the upper limit, Li components which have not been incorporated into crystal structure during synthesis remain on a surface layer of the positive electrode active material particles and, as a result, it becomes difficult to provide a coating material for producing electrodes, battery capacity decreases, and gas generates.

An amount of Ni, represented by "a", in the positive electrode active material particles according to the present invention is $0.82 \leq a < 1.00$, preferably $0.85 \leq a < 1.00$, more preferably $0.86 \leq a < 1.00$, and most preferably $0.86 \leq a \leq 0.96$.

It has been known because a layered lithium-composite oxide of which Metal-site contains a large amount of Ni, e.g., more than 82 mol % of Ni, generally shows strong reducing property of Ni(Ni tries to be reduced to divalent), crystallinity and thermal stability are unstable, and, as a result, positive electrode active material particles composed of such layered lithium-composite oxide are unstable. It has been reported, for example, although a property such as a battery capacity of this positive electrode active material particles is excellent at an early stage, the property immediately becomes to be inferior due to repeat of charge/discharge.

It has been found because Li-site in the positive electrode active material particles according to the present invention is substituted with a part of the divalent metallic element X and electrostatic bonding power with oxygen is increased, the crystal structure of the positive electrode active material particles becomes to be stable and the particles show excellent thermal stability with maintaining a sufficient battery capacity in spite of a large amount of Ni.

An amount of optional Co, represented by "b", in the positive electrode active material particles according to the present invention is $0 \leq b \leq 0.12$, preferably $0 \leq b \leq 0.10$, and more preferably $0.02 \leq b \leq 0.10$.

In a layered lithium-composite oxide containing a large amount of Ni, in general, phase transition of crystal in $LiNiO_2$ occurs due to charge/discharge as a battery, and, as a result, not only battery properties become to be inferior, but also a crystal lattice is damaged, particles are damaged, and thermal stability is lowered. It has been performed, as well-known technics, a small amount of Ni is substituted with Co because the phase transition can be mitigated by substituting a suitable amount of Ni with Co. However, because a positive electrode active material containing a large amount of Ni and an excessively large amount of Co hardly contributes to a redox reaction, not only is battery capacity lowered, but also costs rise due to Co which is a rare metal.

Although an amount of Co is such relatively small in the positive electrode active material particles according to the present invention, the crystal structure and thermal stability can be improved by substitution with the optional metallic element Z as well as the divalent metallic element X. Therefore, the amount of Co can be reduced and rise of costs can be restrained.

In the positive electrode active material particles according to the present invention, there are exemplified Mg ($Mg^{2+}$), Zn ($Zn^{2+}$), Ni ($Ni^{2+}$), and the like as the divalent metallic element X. Among them, Mg is preferred because substitution effect mentioned below is excellent. An amount of the divalent metallic element X, represented by "c+e", in the positive electrode active material particles according to the present invention is $0.001 \leq c+e \leq 0.040$, preferably $0.001 \leq c+e \leq 0.030$, more preferably $0.002 \leq c+e \leq 0.020$, furthermore preferably $0.002 \leq c+e \leq 0.015$, and most preferably $0.002 \leq c+e \leq 0.010$.

One of great characteristics of the positive electrode active material particles according to the present invention is that the divalent metallic element X is contained therein in such specific amount. Substitution of Li-site with a part of the metallic element X could be confirmed by: the phenomenon, i.e., "a peak integrated intensity ratio of the specific planes [(003) plane peak integrated intensity/(104) plane peak integrated intensity] by the XRD of the particles according to the present invention is more changed than that of a material in which the metallic element X is not used for substitution"; and the results of simulation from Rietveld analysis and actual measurement by the XRD. Also from the results of demonstration, i.e., "a battery capacity of positive electrode active material particles in which a large amount of the metallic element X is used for substitution is smaller than that supposed from an amount of Ni in the particles", it could be confirmed an occupation rate of Li in Li-site which should be inserted into a crystal lattice becomes to be low and Li-site is substituted with a small amount of the metallic element X.

The following are descriptions for properties of the positive electrode active material particles according to the present invention, based on doping of the divalent metallic element X capable of substituting for Li-site.

Substitution of a layered lithium-composite oxide with the divalent metallic element Mg has been greatly researched. It is reported: Mg is used for substitution of a part of Li in Li-site; Li-site becomes to be not substituted with Mg as an amount of Li which has been substituted with Mg increases; and then Metal-site containing Ni and/or Co is substituted with Mg. It is also reported, therefore, there is a suitable amount as an effective amount of Mg used for substitution (see Japanese Patent No. 3858699).

In addition to the above, it is reported: cycle property is improved by substitution of Ni with the divalent metallic element Mg; and notably, an amount of Mg used for substitution in Li-site is almost the same as an amount of Mg used for substitution in Metal-site in the obtained layered lithium-composite oxide containing Mg when Rietveld analysis by the XRD is performed (see Effect of magnesium substitution on the cycling behavior of lithium-nickel cobalt oxide, C. Pouillerie, F Perton, Ph. Biensan, J. P. Peres, M. Broussely and C. Delmas, Journal of Power Sources, 96, (2001), 293-302).

However, in these Japanese Patent No. 3858699 and "Effect of magnesium substitution on the cycling behavior of lithium-nickel cobalt oxide", the amount of Ni in Examples is 80 mol % or so, and a high-capacity positive electrode material containing Ni in an amount of 80 mol % or more is not described at all. Also, thermal stability is not described in this literature.

In recent years, intentionality for a positive electrode active material containing a large amount of Ni, which can further heighten a battery capacity, becomes to be high. However, it is apprehensive the positive electrode active material containing a large amount of Ni has risk of firing and thermorunaway. Therefore, although demand for thermal stability is increased in view of safety, there has not been performed: research for improvement of thermal stability by substitution with Mg; and research and technical development for a relationship between stabilization of the crystal structure and improvement of thermal stability.

As a result of earnest investigation, for the layered lithium-composite oxide concerning the present invention, which contained a large amount, i.e., 82 mol % or more, of Ni, and in which the divalent metallic element such as Mg in a smaller amount than a well-known amount was used for substitution, the crystal structure could be stabilized and there could be achieved an initial battery capacity almost complying with theory for an amount of Ni within the scope of the present invention. Therefore, in accordance with the present invention, there can be produced the positive electrode active material particles showing excellent thermal stability in addition to excellent cycle property and little resistance increase before/after cycle operation with maintaining a high battery capacity based on a large amount of Ni which is present intentionality.

The reasons for improvement of thermal stability of the positive electrode active material particles are considered as follows.

In order to illustrate the reasons for improvement of thermal stability, the results of a thermogravimetry differential thermal analysis for the positive electrode active material particles (0.5 mol % substitution with metallic element X=Mg) in Example 1 described below, according to the present invention, and the positive electrode active material particles (no metallic element X for substitution) in Comparative Example 1 are used. Detailed conditions and the like for the thermogravimetry differential thermal analysis are described below.

There is a tendency when a layered lithium-composite oxide as in the present invention becomes to be a charged state (state of Li being desorbed from crystal structure), distortion occurs in a c-axis direction and the crystal structure becomes to be fragile. It has been known when heating of the layered lithium-composite oxide in such state proceeds, the crystal structure is gradually damaged due to desorption of oxygen, and, as a result, phase transition from a layered structure to a spinel structure occurs. It has been also known when heating further proceeds, phase transition of the spinel structure to a rock salt structure, which is a stable phase, occurs.

It is important in the present invention the desorption of oxygen in the layered lithium-composite oxide in charged state occurs at what level of temperature and what level of speed. In case an oxygen desorption reaction occurs at a high temperature side and a low desorption speed, the crystal structure of the positive electrode active material particles is more kept as the layered structure. That is, it is suggested the crystal structure is stable even at a high temperature.

It is suggested because such layered lithium-composite oxide generates small amount of oxygen even at a high temperature, ethylene carbonate (EC) and dimethyl carbonate (DMC), which are non-aqueous solvents in a non-aqueous electrolytic solution, hardly occur heat generation due to oxidation reaction, and the positive electrode active material particles show excellent safety as a battery, i.e., thermal stability.

In order to prove the above phenomena in the present invention, the thermogravimetry differential thermal analysis (TG-DTA measurement) was adopted and illustrated below.

FIG. 1 shows a graph (DTG curve) of which horizontal axis is a temperature "T (° C.)" and vertical axis is a value "DTG (%/min.)" obtained by differentiating weight change "TG (%)" by time, based on the results of the thermogravimetry differential thermal analysis (TG-DTA measurement). Various data based on the graph are as follows.

In accordance with a test using TPD-MS (heating furnace: PY-2020iD, commercially available from Frontier Laboratories Ltd.; GC-MS: GC-MS QP5050, commercially available from SHIMADZU CORPORATION) by the present inventors, it has been confirmed weight decrease of the positive electrode active material particles in charged state at 300° C. or less is due to desorption of oxygen caused by thermal decomposition. Therefore, the value "DTG" exactly shows an oxygen desorption speed.

In accordance with a test using High-temperature XRD (SmartLab, commercially available from Rigaku Corporation) by the present inventors, it could be confirmed a larger amount of oxygen is released as a higher temperature is set, and, as a result, a layered rock salt structure is damaged. It could be also confirmed by rising the temperature after damage of the layered rock salt structure, the phase structure of the positive electrode active material particles changes to the spinel structure and further to the rock salt structure, which is a stable phase as desorption of oxygen proceeds, and as a result, the crystal structure is stabilized.

Figure 2:
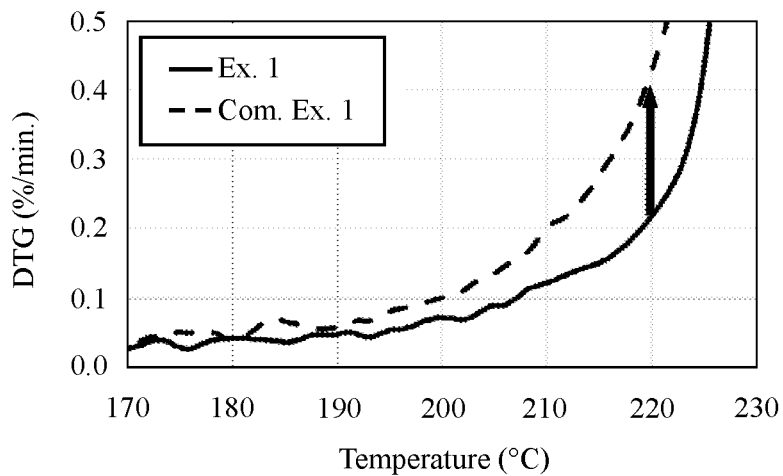
FIG. 2 shows a graph made by enlarging the graph of which temperature range is 170-230° C.

FIG. 2 shows a graph made by enlarging the graph of which temperature range is 170-230° C. in FIG. 1. In order to compare the oxygen desorption speeds, the values "DTG" at 220° C. ("$DTG_{220}$") as representative values of the oxygen desorption speed are shown below. A temperature at which the oxygen desorption speed overs 0.04%/min. was regarded as an oxygen desorption starting temperature "$T_s$".

|  | Ex. 1 | Com. Ex. 1 |
| --- | --- | --- |
| Oxygen desorption starting temperature "$T_s$ (° C.)" | 187 | 171 |
| Oxygen desorption speed at 220° C. "$DTG_{220}$ (%/min.)" | 0.24 | 0.44 |
| Peak top temperature "$T_p$ (° C.)" | 230 | 228 |
| DTG of peak top "$DTG_P$ (%/min.)" | 1.63 | 1.09 |
| "$T_p - T_s$ (° C.)" | 43 | 57 |

By comparing Example 1 and Comparative Example 1 on the results, it is confirmed the following phenomena occurred based on Mg-doping.
1) The oxygen desorption starting temperature "$T_s$" shifted toward a high temperature side.
2) The oxygen desorption speed at 220° C. "$DTG_{220}$" greatly lowered.
3) The peak top temperature "$T_p$" did not change much.

It is important in the present invention whether the value "DTG" within the temperature range from the oxygen desorption starting temperature "$T_s$" to the peak top temperature "$T_p$", i.e., the oxygen desorption speed, is high or low.

The following are observations based on the above results. It is considered the positive electrode active material particles were in a remarkably unstable state as the layered rock salt structure because about 85% of Li in the layered lithium-composite oxide was desorbed therefrom by charge in the test. It is also considered by proceeding heating of the positive electrode active material particles in an unstable structural state, the crystal structure was damaged, that is, bondings between oxygen and mainly Ni among the metallic elements in crystal were cut and oxygen was released from the crystal, and, as a result, damage of the layered rock salt structure proceeded.

Figure 4A:
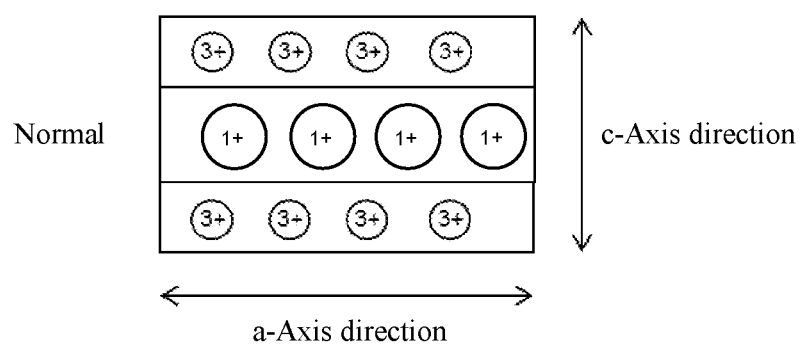
FIG. 4A shows a model diagram of a normal case in which Li-site and Metal-site are not substituted with Mg.
Figure 4B:
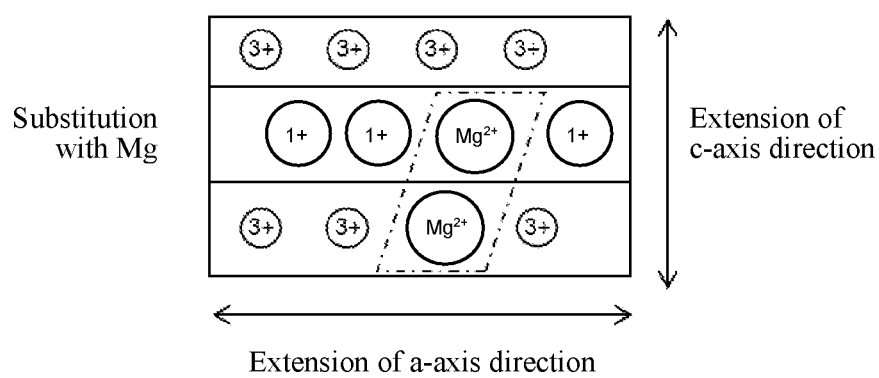
FIG. 4B shows a model diagram of a case in which Li-site and Metal-site are substituted with Mg in Example 1.

However, in Example 1 according to the present invention, it is considered the crystal structure is strengthened because of Pillar effect based on substitution of Li-site and Metal-site with Mg as the metallic element X, which becomes to be a divalent ion, and based on substitution of Metal-site with the metallic element Z. In addition to this strengthened crystal structure, it is considered strength of a Mg—O bonding (melting point of MgO: 2852° C.) and strength of a Al—O bonding (melting point of $Al_2O_3$: 2072° C.) restrain desorption of oxygen within the above temperature range, and, as a result, thermal stability is improved. That is, in case of Example 1 according to the present invention, although the detailed reasons cannot be confirmed, it is considered because structural stabilities including thermal stability in charged state are improved, as shown in a model diagram of FIG. 4B, Li-site and Metal-site are simultaneously substituted and electrical neutrality in both sites is maintained, Mg ions hardly transit in the both substituted sites, and, as a result, there are expected Pillar effect and improvement of bonding power between the divalent ions and oxygen.

Therefore, from the graphs shown in FIGS. 1 and 2, it can be found Example 1 is smaller than Comparative Example 1 as to, for example, an amount of generated oxygen within a temperature range from the peak top temperature "$T_p$" to the oxygen desorption starting temperature "$T_s$", i.e., an integral of DTG within this temperature range on the graph.

The oxygen desorption starting temperature "$T_s$" of the positive electrode active material particles according to the present invention is preferably 180-200° C. and more preferably 180-195° C. The peak top temperature "$T_p$" of the positive electrode active material particles according to the present invention is preferably 218° C. or more and more preferably 220° C. or more. Although the upper limit of the peak top temperature "$T_p$" is not specified in view of excellent structural stability (thermal stability) of a positive electrode material, it is preferred the peak top temperature "$T_p$" is, for example, about 250° C. or less. The oxygen desorption speed at 220° C. "$DTG_{220}$" of the positive electrode active material particles according to the present invention is preferably 0.27%/min. or less and more preferably 0.26%/min. or less.

Thus the positive electrode active material particles according to the present invention contains the divalent metallic element X in an amount within the specific range, which has been used for substitution of, mainly, a part of Li capable of being inserted into a crystal lattice. The amount of the divalent metallic element X is 0.1-4.0 mol % relative to a total amount of Ni, Co which is optional and may be substituted, the divalent metallic element X, and the metallic element Z which is optional and may be used for substitution. That is, the amount is represented as X/(Ni+Co+X+Z) and "c+e" in the above-mentioned compositional formula (0.001≤c+e≤0.040). Therefore, the positive electrode active material particles according to the present invention, shows excellent thermal stability in addition to maintained crystal structural stability and further provide a maintained battery capacity.

In addition to the above, it is considered a balance between "c" and "e" is very important. Although the detailed reasons cannot be confirmed, it is considered the structure becomes to be unstable in case the amount of the divalent metallic element X in Metal-site is excessively large because an ionic radius of the divalent metallic element X is excessively longer than an ionic radius of trivalent Ni. It is also considered a route used for removal/insertion of Li-site is remarkably disordered and transfer of Li is disturbed, and, as a result, it is suggested this disturbance can cause resistance increase.

In the positive electrode active material particles according to the present invention, the optional metallic element Z other than the divalent metallic element X contains at least Al and/or Mn. As the optional metallic element Z other than Al and/or Mn, there are exemplified Ti, V, Fe, Ga, Sr, Y, Zr, Nb, Mo, Ru, In, Sn, Ta, W, Bi, and the like.

An amount of the metallic element Z, represented by "d", in the positive electrode active material particles according to the present invention is $0 \leq d \leq 0.10$, preferably $0.01 \leq d \leq 0.08$, and more preferably $0.01 \leq d \leq 0.07$.

In the positive electrode active material particles according to the present invention, a ratio of the divalent metallic element X to the metallic element Z can be suitably adjusted to a preferred range in accordance with: types and the amount of the divalent metallic element X; types and the amount of the metallic element Z; and the combination of the divalent metallic element X and the metallic element Z.

For example, in case the divalent metallic element X is Mg and the metallic element Z is Al, the amount of Mg ("c+e" in the above-mentioned compositional formula) is preferably $0.001 \leq c+e \leq 0.010$, and more preferably $0.002 \leq c+e \leq 0.008$, and the amount of Al ("d" in the compositional formula) is preferably $0.020 \leq d \leq 0.060$, and more preferably $0.025 \leq d \leq 0.050$. The ratio of Mg to Al (Mg/Al) in the positive electrode active material particles is, for example, preferably 0.02-0.4 or so.

For example, in case the divalent metallic element X is Mg and the metallic element Z is Mn, the amount of Mg ("c+e" in the above-mentioned compositional formula) is preferably $0.001 \leq c+e \leq 0.008$, and the amount of Mn ("d" in the compositional formula) is preferably $0.020 \leq d \leq 0.100$ and more preferably $0.030 \leq d \leq 0.100$. The ratio of Mg to Mn (Mg/Mn) in the positive electrode active material particles is, for example, preferably 0.01-0.5 or so.

For example, in case the divalent metallic element X is Mg and the metallic elements Z are Al and Mn (combination of Al and Mn), the amount of Mg ("c+e" in the above-mentioned compositional formula) is preferably $0.001 \leq c+e \leq 0.008$, the amount of Al ("d" in the compositional formula) is preferably $0.005 \leq d \leq 0.040$, and the amount of Mn ("d" in the compositional formula) is preferably $0.001 \leq d \leq 0.040$. The ratio of Mg to Al and Mn (Mg/(Al+Mn)) in the positive electrode active material particles is, for example, preferably 0.1-1.34 or so.

For the positive electrode active material particles according to the present invention, it is preferred each of an average secondary particle diameter (D50), a crystallite size, a length of a-axis and a length of c-axis of a crystal lattice, a ratio of the length of c-axis to the length of a-axis (c/a), and a cation mixing amount is respectively within a range shown below.

The average secondary particle diameter (D50) is preferably 2-20 μm, more preferably 2-18 μm, furthermore preferably 3-15 μm, and most preferably 3-12 μm. When the D50 is smaller than the lower limit, it is likely a positive electrode containing the positive electrode active material particles easily reacts with an electrolytic solution and battery properties deteriorate. It is also likely, in a practical manner, a density of the positive electrode active material particles becomes to be low and an electrode density of the positive electrode becomes to be excessively low. When the D50 is larger than the upper limit, it is likely contact of the positive electrode containing the positive electrode active material particles with the electrolytic solution becomes to be bad and deteriorated battery properties such as non-maintained necessary output are shown. It is also likely Li cannot be inserted into central parts during calcination when the positive electrode active material particles are synthesized, distortion occurs within particles, and thermal stability and structural stability are lowered.

The crystallite size is preferably 50-400 nm, more preferably 55-400 nm, furthermore preferably 200-380 nm, and most preferably 200-370 nm. When the crystallite size is smaller than the lower limit, it is likely a crystal structure of the positive electrode active material particles becomes to be unstable. When the crystallite size is larger than the upper limit, it is likely battery properties of a non-aqueous electrolyte secondary battery in which the positive electrode active material particles are used deteriorate.

The length of a-axis of a crystal lattice is preferably 2.840-2.890 Å and more preferably 2.845-2.885 Å. The length of c-axis of the crystal lattice is preferably 14.160-14.200 Å and more preferably 14.170-14.200 Å.

In case the divalent metallic element X is used for substitution of a part of Li capable of being inserted into a crystal lattice, as the positive electrode active material particles according to the present invention, the crystal lattice tends to be larger than a crystal lattice of conventional positive electrode active material particles in which the metallic element X is not used for substitution. However, the ratio of the length of c-axis to the length of a-axis (c/a) is preferably 4.94-4.96, i.e., 4.95 or so. Thus in case the ratio of the length of c-axis to the length of a-axis (c/a) is 4.95 or so, it is considered a crystal structure is stable as the layered rock salt structure although the crystal lattice itself is enlarged, and, as a result, structural stability of the positive electrode active material particles is maintained.

The cation mixing amount varies in accordance with: the amount of the divalent metallic element X (X/(Ni+Co+X+Z)), particularly an amount of the divalent metallic element X substituting for Li-site; the molar ratio of Li to the metallic elements (Li/(Ni+Co+X+Z)); and the like. The cation mixing amount is preferably 0.7-4.0%, more preferably 0.8-3.5%, and furthermore preferably 0.8-3.0%.

The cation mixing amount generally indicates the following amount. Although an occupation rate of Li in Li-site is basically 100%, Ni mainly contained in Metal-site converts into divalent Ni and transfers to Li-site during calcination when the layered lithium-composite oxide is synthesized. Thus, the cation mixing amount is represented as an amount of metal which has transferred to Li-site and with which Li has been substituted. It is known the cation mixing amount is, as usual, 0.5-5.0% or so.

In the positive electrode active material particles according to the present invention, both Li-site and Metal-site are substituted with the divalent metallic element X. Therefore, the cation mixing amount in Li-site is based on: the divalent metallic element X which has been used for substitution of Li-site; and partially, divalent Ni existing in Li-sate, which had been converted from Ni during synthesis of a layered lithium-composite oxide (calcination at a high temperature). In order to separately determine the quantity of: a cation mixing amount based on the divalent metallic element X which has been used for substitution; and another cation mixing amount based on the divalent Ni which has existed previously, there can be used a method for making an assumption in accordance with Rietveld analysis by the XRD, such as, for example, a method for fixing a cation mixing amount of only Ni among the amount of Ni in Comparative Example 1 mentioned below as an occupation rate of the divalent Ni in Li-site.

In conventional positive electrode active material particles, such as the positive electrode active material particles in each of Comparative Examples mentioned below, in which the divalent metallic element X is not used for substitution, the cation mixing amount in Li-site is mainly an amount of divalent Ni which has transferred to Li-site during synthesis of a lithium-composite oxide.

<Method for Producing Positive Electrode Active Material Particles>

The method for producing the positive electrode active material particles, according to the present invention, will be described.

In the method for producing the positive electrode active material particles, according to the present invention, the step (I) or the step (II) mentioned below is included.

The step (I) includes in this order:
synthesizing of a precursor compound by coprecipitating
an aqueous solution containing an aqueous solution of a nickel compound, an optional aqueous solution of a cobalt compound, and an optional aqueous solution of a metallic element Z compound, and
an aqueous solution of a divalent metallic element X compound, which is capable of substituting for Li-site
in a wet type reaction by using an alkaline aqueous solution;
washing with water and drying of the precursor compound;
mixing of a lithium compound and the precursor compound at a prescribed ratio to prepare a mixture; and
calcinating of the mixture under an oxidizing atmosphere at 650-850° C. to prepare a layered lithium-composite oxide.

The step (II) includes in this order:
synthesizing of a precursor compound by coprecipitating an aqueous solution containing an aqueous solution of a nickel compound, an optional aqueous solution of a cobalt compound, and an optional aqueous solution of a metallic element Z compound in a wet type reaction by using an alkaline aqueous solution;
washing with water and drying of the precursor compound;
mixing of a lithium compound, the precursor compound, and a divalent metallic element X compound, which is capable of substituting for Li-site, at a prescribed ratio to prepare a mixture; and
calcinating of the mixture under an oxidizing atmosphere at 650-850° C. to prepare a layered lithium-composite oxide.

In the method according to the present invention, it is particularly important the amount of the divalent metallic element X capable of substituting for Li-site is adjusted to 0.1-4.0 mol % relative to the total amount of Ni, optional Co, the divalent metallic element X, and the optional metallic element Z when the step (I) or the step (II) is performed.

In the method according to the present invention, the step (I) or the step (II) can be adopted. That is, as procedures in the step (I), the divalent metallic element X is introduced into the precursor compound by a pre-addition method in which the divalent metallic element X compound as an aqueous solution is blended with an aqueous solution of other metallic elements when the precursor compound is synthesized, and, as a result, a part of Li which will be inserted into a crystal lattice of the aimed positive electrode active material particles can be substituted with the divalent metallic element X. As procedures also in the step (II), a part of Li, which will be inserted into a crystal lattice of the aimed positive electrode active material particles, can be substituted with the divalent metallic element X by a post-addition method in which the divalent metallic element X compound is introduced into a mixing system in powder form, droplet form, or spray form after synthesis of the precursor compound. In consideration of more uniform substitution in primary particles with the divalent metallic element X during calcination, it is preferred the step (I) is adopted.

Between a case the step (I) is adopted, in which the divalent metallic element X compound is added to a reaction system when the precursor compound is synthesized, and a case the step (II) is adopted, in which the divalent metallic element X compound is added to the mixing system after synthesis of the precursor compound, there are the following differences. That is, there is a possibility of differences in: a half-value width of diffraction peak on a specific crystal plane; and a ratio of an intensity of diffraction peak on one specific crystal plane to an intensity of diffraction peak on the other specific crystal plane, which are obtained by the XRD of the layered lithium-composite oxide.

The reasons for the above-mentioned differences are as follows. That is, when the lithium compound, the precursor compound, and the divalent metallic element X compound are calcinated at a calcination temperature mentioned below in a calcination step of the step (II), the divalent metallic element X cannot be uniformly inserted into particles because of a solid phase reaction. This phenomenon can be recognized by the XRD and in accordance with Rietveld analysis by using the results of the XRD, and it is considered deviation from the most suitable condition occurs.

The nickel compounds used for the method according to the present invention, for example, without specific limitations are cited nickel sulfate, nickel oxide, nickel hydroxide, nickel nitrate, nickel carbonate, nickel chloride, nickel iodide, metallic nickel, and the like. The preferable example is nickel sulfate.

The cobalt compounds used for the method according to the present invention, for example, without specific limitations are cited cobalt sulfate, cobalt oxide, cobalt hydroxide, cobalt nitrate, cobalt carbonate, cobalt chloride, cobalt iodide, metallic cobalt, and the like. The preferable example is cobalt sulfate.

The metallic element Z compounds used for the method according to the present invention, for example, are cited aluminum compounds, manganese compounds, niobium compounds, tungsten compounds, and the like.

The aluminum compounds, for example, without specific limitations are cited aluminum sulfate, aluminum oxide, aluminum hydroxide, aluminum nitrate, aluminum carbonate, aluminum chloride, aluminum iodide, sodium aluminate, metallic aluminum, and the like. The preferable example is aluminum sulfate or sodium aluminate when the step (I) is adopted, while the preferable example is aluminum oxide when the step (II) is adopted.

The manganese compounds, for example, without specific limitations are cited manganese sulfate, manganese oxide, manganese hydroxide, manganese nitrate, manganese carbonate, manganese chloride, manganese iodide, metallic manganese, and the like. The preferable example is manganese sulfate when the step (I) is adopted, while the preferable example is manganese oxide or manganese hydroxide when the step (II) is adopted.

The niobium compounds, for example, without specific limitations are cited niobium oxide, niobium chloride, lithium niobate, niobium iodide, and the like. The preferable example is niobium oxide. In accordance with adoption of the step (I) or the step (II), compounds showing easy handling can be selected.

The tungsten compounds, for example, without specific limitations are cited tungsten oxide, sodium tungstate, ammonium paratungstate, tungsten hexacarbonyl, tungsten sulfide, and the like. The preferable example is tungsten oxide. In accordance with adoption of the step (I) or the step (II), compounds showing easy handling can be selected.

The divalent metallic element X compounds used for the method according to the present invention, for example, are cited magnesium compounds, zinc compounds, nickel compounds, and the like. The preferable example is the magnesium compounds or the zinc compounds, and the more preferable example is the magnesium compounds.

The magnesium compounds, for example, without specific limitations are cited magnesium sulfate, magnesium oxide, magnesium hydroxide, magnesium nitrate, magnesium carbonate, magnesium chloride, magnesium iodide, metallic magnesium, and the like. The preferable example is magnesium sulfate when the step (I) is adopted, while the preferable example is magnesium oxide when the step (II) is adopted.

The zinc compounds, for example, without specific limitations are cited zinc sulfate, zinc oxide, zinc hydroxide, zinc nitrate, zinc carbonate, zinc chloride, zinc iodide, metallic zinc, and the like. The preferable example is zinc sulfate when the step (I) is adopted, while the preferable example is zinc oxide when the step (II) is adopted.

In case the step (I) is adopted, each of an aqueous solution of the nickel compound, an optional aqueous solution of the cobalt compound, and an optional aqueous solution of the metallic element Z compound is prepared. An aqueous solution of the divalent metallic element X compound is also prepared so that the amount of the divalent metallic element X is adjusted to 0.1-4.0 mol % relative to the total amount of Ni, optional Co, the divalent metallic element X, and the optional metallic element Z. Into a reaction vessel where at least one alkaline aqueous solution such as a sodium hydroxide aqueous solution or an ammonia solution as a mother liquor is stirred, there are dropped: an aqueous solution containing the aqueous solution of the nickel compound, the optional aqueous solution of the cobalt compound, the optional aqueous solution of the metallic element Z compound, and the aqueous solution of the divalent metallic element X compound. A pH of a reaction system in the reaction vessel is monitored and controlled with dropping sodium hydroxide or the like so as to be adjusted to a suitable range. The reaction system is coprecipitated as mainly hydroxides by crystallization and agglomeration, and, as a result, the precursor compound can be synthesized.

In case sharp particle size distribution is desired for secondary agglomerated particles of the precursor compound synthesized by the above reaction, for example, in case it is desired a value of "(D90−D10)/D50" becomes to be small, the aimed precursor compound can be synthesized by performing a batch type reaction for a prescribed time, stopping drop and stir of raw materials, and coprecipitating. While in case broad particle size distribution is desired, the aimed precursor compound can be synthesized by performing a continuous reaction and overflowing coprecipitates together with a reaction solution. The particle size distribution can be designed by combining these reaction procedures.

It is preferred an inner part of the reaction vessel is purged by using inert gas or industrially preferable $N_2$ gas from a preparation stage of the alkaline aqueous solution as a mother liquor in this reaction, and the reaction is performed at an oxygen concentration as low as possible in a system and the solution of the reaction vessel. In case purge by using $N_2$ gas is not performed, it is likely coprecipitated hydroxides by crystallization are oxidized due to residual oxygen and agglomerates cannot be formed by crystallization.

In case the step (II) is adopted, each of an aqueous solution of the nickel compound, an optional aqueous solution of the cobalt compound, and an optional aqueous solution of the metallic element Z compound are prepared. Into a reaction vessel where at least one alkaline aqueous solution, such as a sodium hydroxide aqueous solution, or an ammonia solution, such as a mother liquor, is stirred, there is dropped an aqueous solution containing the aqueous solution of the nickel compound, the optional aqueous solution of the cobalt compound, and the optional aqueous solution of the metallic element Z compound. A pH of a reaction system in the reaction vessel is monitored and controlled with dropping sodium hydroxide or the like so as to be adjusted to a suitable range. The reaction system is coprecipitated as mainly hydroxides by crystallization and agglomeration, and, as a result, the precursor compound can be synthesized.

In the step (I) or the step (II), a blending ratio of the nickel compound, the optional cobalt compound, and the optional metallic element Z compound is suitably adjusted so that a ratio of the amount of Ni, the amount of optional Co, and the amount of the optional metallic element Z becomes to be a desired value in consideration of composition of the aimed positive electrode active material particles. That is, the blending ratio is suitably adjusted so that the positive electrode active material particles produced by the method according to the present invention can be represented by the compositional formula:

$$(Li_\gamma X_e)(Ni_a Co_b X_c Z_d)O_2$$

In the compositional formula: X is a divalent metallic element capable of substituting for Li-site; Z is a metallic element containing at least Al and/or Mn, other than X; $0.93 \leq \gamma \leq 1.15$; $0.82 \leq a < 1.00$; $0 \leq b \leq 0.12$; $0.001 \leq c+e \leq 0.040$; $0 \leq d \leq 0.10$; and $a+b+c+d=1$.

In the step (I), the amount of the divalent metallic element X is suitably adjusted so that the amount becomes to be 0.1-4.0 mol %, preferably 0.1-3.0 mol %, more preferably 0.2-2.0 mol %, furthermore preferably 0.2-1.5 mol %, and most preferably 0.2-1.0 mol %, relative to the total amount of Ni, optional Co, the divalent metallic element X, and the optional metallic element Z. That is, the amount is suitably adjusted so that the positive electrode active material particles produced by the method according to the present invention can be represented by the compositional formula:

$$(Li_\gamma X_e)(Ni_a Co_b X_c Z_d)O_2$$

In the compositional formula: X is a divalent metallic element capable of substituting for Li-site; Z is a metallic element containing at least Al and/or Mn, other than X; $0.93 \leq \gamma \leq 1.15$; $0.82 \leq a < 1.00$; $0 \leq b \leq 0.12$; $0.001 \leq c+e \leq 0.040$; $0 \leq d \leq 0.10$; and $a+b+c+d=1$.

When the amount of the divalent metallic element X is less than the lower limit, an amount of the divalent metallic element X used for substitution becomes to be excessively small, and, as a result, sufficient effects for improvement of thermal stability, which are aimed in the present invention, cannot be imparted to the positive electrode active material particles. When the amount of the divalent metallic element X is more than the upper limit, the amount of the divalent metallic element X used for substitution becomes to be excessively large, an amount of Li in Li-site becomes to be insufficient, a battery capacity of a non-aqueous electrolyte secondary battery in which the positive electrode active material particles are used lowers, and, as a result, the battery capacity cannot satisfy a battery capacity which is demanded for a battery in which a positive electrode material containing a large amount of Ni is used. In addition, an amount of the divalent metallic element X in Metal-site becomes to be excessively large, crystal is distorted, and, as a result, thermal stability lowers.

In the step (I), a ratio of the divalent metallic element X to the metallic element Z can be suitably adjusted to a preferred range in accordance with: types and the amount of the divalent metallic element X; types and the amount of the metallic element Z; and combination of the divalent metallic element X and the metallic element Z.

For example, in case the divalent metallic element X is Mg and the metallic element Z is Al, the amount of Mg is preferably 0.1-1.0 mol % and more preferably 0.2-0.8 mol % relative to the above-mentioned total amount, and the amount of Al is preferably 2.0-6.0 mol % and more preferably 2.5-5.0 mol % relative to the above-mentioned total amount. The ratio of Mg to Al (Mg/Al) in the step (I) is, for example, preferably 0.02-0.4 or so.

For example, in case the divalent metallic element X is Mg and the metallic element Z is Mn, the amount of Mg is preferably 0.1-0.8 mol % relative to the above-mentioned total amount, and the amount of Mn is preferably 2.0-10.0 mol % and more preferably 3.0-10.0 mol % relative to the above-mentioned total amount. The ratio of Mg to Mn (Mg/Mn) in the step (I) is, for example, preferably 0.01-0.5 or so.

For example, in case the divalent metallic element X is Mg and the metallic elements Z are Al and Mn (combination of Al and Mn), the amount of Mg is preferably 0.1-0.8 mol % relative to the above-mentioned total amount, the amount of Al is preferably 0.5-4.0 mol % relative to the above-mentioned total amount, and the amount of Mn is preferably 0.1-4.0 mol % relative to the above-mentioned total amount. The ratio of Mg to Al and Mn (Mg/(Al+Mn)) in the step (I) is, for example, preferably 0.1-1.34 or so.

In the step (I) or the step (II), a suitable range of a pH when the precursor compound is synthesized is preferably 11.0-13.5. By controlling the pH during reaction to this range, in case the pH is large, there can be synthesized small agglomerated particles having D50 of 3 μm or so as in the present invention, while in case the pH is small, there can be synthesized large agglomerated particles having D50 of 18 μm or so as also in the present invention.

In the step (I) or the step (II), the precursor compound synthesized by a wet type reaction is washed with water, dehydrated, and dried.

By washing the precursor compound with water, there can be washed away impurities such as sulfate radicals, carbonate radicals, and Na components which have been incorporated into the agglomerated particles during the reaction and/or which are attached to a surface layer of the precursor compound. For the washing with water, there can be adopted: Nutsche washing method by using Buechner funnel for the precursor compound in a small amount; and a method in which a suspension after the reaction is transferred to a press filter and washed with water, and then dehydrated. For the washing with water, there can be used pure water, a sodium hydroxide aqueous solution, a sodium carbonate aqueous solution, and the like, and it is industrially preferred pure water is used. However, it is preferred a sodium hydroxide aqueous solution is used for the washing with water in case an amount of residual sulfate radicals is large.

By drying the precursor compound, it is preferred a hydroxide phase of Ni, Co, the divalent metallic element X, and/or the metallic element Z exists as a monolayer in the precursor compound when the precursor compound is identified by the XRD. However, the precursor compound can contain an oxyhydroxide phase or a spinel compound phase as a different phase of the hydroxide phase. The drying can be performed under the following conditions. That is, a present temperature of a drying device is within a range of 80-300° C. or so, and there can be adopted an airflow drying method, a shelf drying method by using a thermostatic chamber, a method by using a vacuum dryer, and the like. It is preferred that the drying is performed under an oxidizing atmosphere; a reducing atmosphere; a decarbonation atmosphere in which, for example, a concentration of carbon dioxide is about 40 ppm or less; a vacuum atmosphere; and the like.

In the step (I) or the step (II), based on the metallic element Z compound which is optionally blended during the wet type reaction, the metallic element Z can exist within particles, on grain boundaries, and/or on an edge of particles of the precursor compound.

The precursor compound synthesized in the step (I) or the step (II) can be subjected to an oxidation treatment under the oxidizing atmosphere at a temperature of 350-680° C. The temperature for the oxidation treatment is preferably 530-680° C. and more preferably 550-650° C. By the oxidation treatment, the precursor compound is oxidized and simultaneously impurities such as residual sulfate radicals and residual carbonate radicals can be desorbed from the precursor compound. As a result, reactivity of the precursor compound with the lithium compound during calcination mentioned below is improved. For the oxidation treatment, there can be used a box type furnace, a roller hearth kiln, a rotary kiln, and the like. It is preferred the rotary kiln is used, by which continuous oxidation treatment can be performed.

The average secondary particle diameter (D50) of the precursor compound is preferably 2-20 μm, more preferably 2-18 μm, and furthermore preferably 3-14 μm. When the D50 of the precursor compound is within the range, an amount of a positive electrode active material per unit area can be increased because a filling density becomes to be high during production of a positive electrode by using the positive electrode active material particles. In addition, cracking due to high compression hardly occurs, and the produced non-aqueous electrolyte secondary battery shows sufficient load characteristics and excellent thermal stability.

In case the step (I) is adopted, after the precursor compound is washed with water and dried as mentioned above, the lithium compound and the precursor compound are mixed with each other at a prescribed ratio to prepare a mixture, and the mixture is calcinated under the oxidizing atmosphere at 650-850° C. to prepare a layered lithium-composite oxide. A calcination temperature in the step (I) is preferably 680-840° C. and more preferably 680-830° C. While in case the step (II) is adopted, after the precursor compound is washed with water and dried as mentioned above, the lithium compound, the precursor compound and the divalent metallic element X compound are mixed with each other at a prescribed ratio to prepare a mixture, and the mixture is calcinated under the oxidizing atmosphere at 650-850° C. to prepare a layered lithium-composite oxide. A calcination temperature in the step (II) is preferably 680-840° C. and more preferably 680-830° C. In the step (II), there can be adopted the following procedures. That is, the precursor compound and the divalent metallic element X compound are mixed with each other to prepare a mixture and the mixture is temporarily calcinated so that uniform substitution in particles can be achieved by the divalent metallic element X, and then, the temporarily calcinated mixture is mixed with the lithium compound in a prescribed amount.

In the method according to the present invention, as the lithium compounds, various lithium salts can be used without specific limitations. The lithium compounds, for example, are cited lithium hydroxide monohydrate, lithium hydroxide anhydride, lithium nitrate, lithium carbonate, lithium acetate, lithium bromide, lithium chloride, lithium citrate, lithium fluoride, lithium iodide, lithium lactate, lithium oxalate, lithium phosphate, lithium pyruvate, lithium sulfate, lithium oxide, and the like. In particular, the preferable example is either lithium carbonate, lithium hydroxide monohydrate, or lithium hydroxide anhydride.

In the step (I), a blending ratio of the lithium compound and the precursor compound is suitably adjusted so that a ratio of the amount of Li to the total amount of Ni, optional Co, the divalent metallic element X, and the optional metallic element Z becomes to be a desired value in consideration of composition of the aimed positive electrode active material particles. That is, the blending ratio in the step (I) is suitably adjusted so that the positive electrode active material particles produced by the method according to the present invention can be represented by the compositional formula:

$$(Li_\gamma X_e)(Ni_a Co_b X_c Z_d)O_2$$

in the compositional formula: X is a divalent metallic element capable of substituting for Li-site; Z is a metallic element containing at least Al and/or Mn, other than X; $0.93 \leq \gamma \leq 1.15$; $0.82 \leq a < 1.00$; $0 \leq b \leq 0.12$; $0.001 \leq c+e \leq 0.040$; $0 \leq d \leq 0.10$; and $a+b+c+d=1$.

In the step (II), a blending ratio of the lithium compound, the precursor compound, and the divalent metallic element X is suitably adjusted so that a ratio of the amount of Li to the total amount of Ni, optional Co, the divalent metallic element X, and the optional metallic element Z becomes to be a desired value in consideration of the composition of the aimed positive electrode active material particles. That is, the blending ratio in the step (II) is suitably adjusted so that the positive electrode active material particles produced by the method according to the present invention can be represented by the compositional formula:

$$(Li_\gamma X_e)(Ni_a Co_b X_c Z_d)O_2$$

in the compositional formula: X is a divalent metallic element capable of substituting for Li-site; Z is a metallic element containing at least Al and/or Mn, other than X; $0.93 \leq \gamma \leq 1.15$; $0.82 \leq a < 1.00$; $0 \leq b \leq 0.12$; $0.001 \leq c+e \leq 0.040$; $0 \leq d \leq 0.10$; and $a+b+c+d=1$.

In the step (II), the amount of the divalent metallic element X is suitably adjusted so that the amount becomes to be 0.1-4.0 mol %, preferably 0.1-3.0 mol %, more preferably 0.2-2.0 mol %, furthermore preferably 0.2-1.5 mol %, and most preferably 0.2-1.0 mol %, relative to the total amount of Ni, optional Co, the divalent metallic element X, and the optional metallic element Z. That is, the amount is suitably adjusted so that the positive electrode active material particles produced by the method according to the present invention can be represented by the compositional formula:

$$(Li_\gamma X_e)(Ni_a Co_b X_c Z_d)O_2$$

in the compositional formula: X is a divalent metallic element capable of substituting for Li-site; Z is a metallic element containing at least Al and/or Mn, other than X; $0.93 \leq \gamma \leq 1.15$; $0.82 \leq a < 1.00$; $0 \leq b \leq 0.12$; $0.001 \leq c+e \leq 0.040$; $0 \leq d \leq 0.10$; and $a+b+c+d=1$.

Both the reason for inadequacy when the amount of the divalent metallic element X is less than the above-mentioned lower limit and the reason for inadequacy when the amount of the divalent metallic element X is more than the above-mentioned upper limit in the step (II) are the same as in the step (I).

In the step (II), a ratio of the divalent metallic element X to the metallic element Z can be suitably adjusted to a preferred range in accordance with: types and the amount of the divalent metallic element X; types and the amount of the metallic element Z; the and combination of the divalent metallic element X and the metallic element Z.

For example, in case the divalent metallic element X is Mg and the metallic element Z is Al, the amount of Mg is preferably 0.1-1.0 mol % and more preferably 0.2-0.8 mol % relative to the above-mentioned total amount. The amount of Al is preferably 2.0-6.0 mol % and more preferably 2.5-5.0 mol % relative to the above-mentioned total amount. The ratio of Mg to Al (Mg/Al) in the step (II) is, for example, preferably 0.02-0.4 or so.

For example, in case the divalent metallic element X is Mg and the metallic element Z is Mn, the amount of Mg is preferably 0.1-0.8 mol % relative to the above-mentioned total amount, and the amount of Mn is preferably 2.0-10.0 mol % and more preferably 3.0-10.0 mol % relative to the above-mentioned total amount. The ratio of Mg to Mn (Mg/Mn) in the step (II) is, for example, preferably 0.01-0.5 or so.

For example, in case the divalent metallic element X is Mg and the metallic elements Z are Al and Mn (combination of Al and Mn), the amount of Mg is preferably 0.1-0.8 mol % relative to the above-mentioned total amount, the amount of Al is preferably 0.5-4.0 mol % relative to the above-mentioned total amount, and the amount of Mn is preferably 0.1-4.0 mol % relative to the above-mentioned total amount. The ratio of Mg to Al and Mn (Mg/(Al+Mn)) in the step (II) is, for example, preferably 0.1-1.34 or so.

In the step (I) or the step (II), a calcination temperature for preparation of the layered lithium-composite oxide is 650-850° C., preferably 680-840° C., and more preferably 680-830° C. When the calcination temperature is lower than the lower limit, the layered lithium-composite oxide (positive electrode active material particles) having a desired crystal structure cannot be produced. When the calcination temperature is higher than the upper limit, crystal growth excessively proceeds, and battery properties exhibited from the produced layered lithium-composite oxide (positive electrode active material particles) deteriorate.

It is necessary calcination is performed under an oxidizing atmosphere. It is preferred the calcination is performed under an atmosphere in an oxygen concentration of preferably 75 vol % or more, more preferably 80 vol % or more, and furthermore preferably 85 vol % or more.

A dry type mixture or a wet type mixture can be adopted for: mixing the lithium compound and the precursor compound in the step (I); and mixing the lithium compound, the precursor compound, and the divalent metallic element X compound in the step (II), as long as uniform mixing is achieved. In case the wet type mixture is performed, for example, the compounds used for mixture are brought into contact with water in a prescribed amount and granulated by using a spray dryer to give a uniform mixture.

Because the positive electrode active material particles according to the present invention are composed of the layered lithium-composite oxide containing Ni in a large amount, there is a possibility an amount of residual Li compounds becomes to be larger than that of positive electrode active material particles composed of a lithium-composite oxide containing Ni in a small amount. Therefore, in order to reduce the amount of the residual Li compounds in the method according to the present invention, it is preferred a surface of primary particles and/or a surface of secondary particles of the layered lithium-composite oxide are subjected to a surface treatment and are more stabilized.

As a method for the surface treatment, for example, without specific limitations are adopted: a method in which fine particles of aluminum oxide are allowed to adhere to a surface layer of agglomerated particles of the layered lithium-composite oxide in a dry type method with adding shearing force thereto, and then, a heat treatment is performed at 300-600° C. or so; a method in which the layered lithium-composite oxide in a prescribed amount is brought into contact with an aqueous solution prepared by dissolving sodium aluminate in a prescribed amount therein, they are stirred for 5-10 minutes or so, dehydrated and dried, and then, they are subjected to a heat treatment at 300-700° C. or so to give the layered lithium-composite oxide having a surface layer coated with the aluminum compound corresponding thereto; and the like.

As mentioned above, a dry type method and a wet type method each by using the aluminum compound are exemplified as a method for the surface treatment. By the dry type method for the surface treatment, Li—Al—O and $Al_2O_3$ are formed on the surface layer of particles by the heat treatment. Thus, Al traps Li and it becomes to be possible to reduce a residual lithium amount. It is said Li—Al—O is an ion conductor and shows high corrosion resistance and, as a result, it becomes to be possible to improve battery properties. While by the wet type method for the surface treatment, it is considered residual lithium components dissolve in an aluminum aqueous solution by bringing the layered lithium-composite oxide into contact with the aluminum aqueous solution, it is also recognized $Al_2O_3$ is formed on the surface layer of the particles by the heat treatment after contact. That is, it is preferred to plan to reduce the residual lithium amount and improve battery properties by using any method for the surface treatment.

<Non-Aqueous Electrolyte Secondary Battery>

The non-aqueous electrolyte secondary battery according to the present invention will be described. The non-aqueous electrolyte secondary battery includes a positive electrode which contains the positive electrode active material particles according to the present invention.

The non-aqueous electrolyte secondary battery according to the present invention is constituted of the positive electrode, a negative electrode, and an electrolytic solution containing an electrolyte.

The positive electrode is produced in accordance with an ordinary method. That is, a conductive agent and a binder are added to the positive electrode active material particles according to the present invention, and these are mixed with each other. As the conductive agent, for example, acetylene black, carbon black, graphite, and the like are preferred. As the binder, for example, polytetrafluoroethylene, polyvinylidene fluoride, and the like are preferred.

For the negative electrode, there can be used negative electrode active materials such as: at least one nonmetallic element or metallic element selected from the group consisting of Si, Al, Sn, Pb, Zn, Bi, and Cd; an alloy containing the element(s) or a chalcogenide containing the element(s); metallic lithium; graphite; and a low crystalline carbon material.

As a solvent of the electrolytic solution, there can be used an organic solvent including at least one of carbonates such as propylene carbonate and dimethyl carbonate, and ethers such as dimethoxyethane, as well as a combination of ethylene carbonate and diethyl carbonate.

As the electrolyte, there can be used at least one of lithium salts such as lithium perchlorate, lithium tetrafluoroborate, as well as lithium hexafluorophosphate, which are dissolved in the above-mentioned solvent.

<Function>

The positive electrode active material particles according to the present invention contains the divalent metallic element X in a specific amount, and mainly a part of Li-site is substituted with the divalent metallic element X. Therefore, the positive electrode active material particles according to the present invention surely show excellent structural stability with maintaining a sufficient battery capacity, and also show excellent thermal stability in addition to little resistance increase and excellent cycle property, in comparison with conventional positive electrode active material particles containing Ni in a large amount, in which Li-site is not substituted with metallic elements.

The present invention will be concretely described by using specific examples of the present invention and comparative examples. However, the present invention is not limited to these examples.

<Composition of Precursor Compound and Positive Electrode Active Material Particles>

In this specification, the composition of the precursor compound and the positive electrode active material particles was determined in accordance with the following procedures. That is, a sample, i.e., 0.2 g of each precursor compound or each positive electrode active material particles, was heated and dissolved in 25 mL of a hydrochloric acid solution having a concentration of 20% to give a sample solution. After the sample solution was cooled, the sample solution was transferred to a volumetric flask having a capacity of 100 mL, and then pure water was added thereto to give an adjusted solution. The quantity of each element in the precursor compound or the positive electrode active material particles was determined by using the adjusted solution and ICP-AES Spectrometer "Optima 8300," commercially available from PerkinElmer Japan Co., Ltd.

<Average Secondary Particle Diameter (D50) of Precursor Compound and Positive Electrode Active Material Particles>

The average secondary particle diameter (D50) was measured in a volume standard by a wet laser method using a laser type particle size distribution measuring apparatus "Microtrack HRA," commercially available from NIKKISO CO., LTD.

<Rietveld Analysis of Positive Electrode Active Material Particles>

The XRD data were obtained under the following X-ray diffraction conditions by using X-ray diffractometer "Smart-Lab" commercially available from Rigaku Corporation.

(X-Ray Diffraction Conditions)

| | |
|---|---|
| X-ray source: | Cu-Kα ray |
| Accelerating voltage and current: | 45 kV and 200 mA |
| Sampling width: | 0.02 deg. |
| Scan range: | 15-122 deg. |
| Scan speed: | 0.4°/min. step |
| Divergence slit width: | 0.65 deg. |
| Light receiving slit width: | 0.2 mm |
| Scattering slit width: | 0.65 deg. |

The Rietveld analysis was performed by using the obtained XRD data. For the Rietveld analysis, "R. A. Young, ed., The Rietveld Method, Oxford University Press (1992)" was used as a reference. The analysis was performed so that S value in fitting is within a range of 1.20-1.45. From the results of the Rietveld analysis, there were obtained the crystallite size, the length of a-axis and the length of c-axis of a crystal lattice, the ratio of the length of c-axis to the length of a-axis (c/a), and the cation mixing amount, for the positive electrode active material particles.

<Thermogravimetry Differential Thermal Analysis of Positive Electrode Active Material Particles>

By using the thermogravimetry differential thermal analysis (TG-DTA) apparatus "DTG-60H," commercially available from SHIMADZU CORPORATION, the TG-DTA measurement was performed in accordance with the following method under the following conditions.

A coin cell was assembled by using the positive electrode active material particles in accordance with a method mentioned below. The coin cell was subjected to initial charge (cc-cv) at a current density of 0.1 C rate with a cut-off voltage from 3.0V to 4.3V under an environment at 25° C. so that 85% of Li (about 4.3V) in the positive electrode active material particles was desorbed. Then, the charged coin cell was taken to pieces in a glove box, and a positive electrode was collected. The collected positive electrode was washed with DMC for 10 minutes and dried under vacuum. Then, the positive electrode was scraped off from metallic aluminum foil by using a spatula in the glove box. A platinum chamber used for measurement was filled with 15 mg of the obtained electrode material powder and set on a measurement balance of the TG-DTA apparatus.

(TG-DTA Measurement Conditions)

| | |
|---|---|
| Reference: | Platinum chamber filled with 15 mg of $Al_2O_3$ |
| Maximum temperature: | 500° C. |
| Temperature rising rate: | 5° C./min. |
| Measurement environment: | $N_2$ gas atmosphere (200 mL/min.) |

Based on the obtained results, there was made a graph (see FIG. 1) of which horizontal axis was a temperature and vertical axis was a value "DTG" (oxygen desorption speed in the present invention) obtained by differentiating weight change "TG" by time. As parameters with respect to desorption of oxygen, there were obtained the oxygen desorption starting temperature "$T_s$," the oxygen desorption speed at 220° C. "$DTG_{220}$," the peak top temperature "$T_p$," and the oxygen desorption speed of peak top "$DTG_p$." There was calculated the difference "$T_p$-$T_s$" between the peak top temperature "$T_p$" and the oxygen desorption starting temperature "$T_s$". A temperature at which the oxygen desorption speed overs 0.04%/min. was regarded as the oxygen desorption starting temperature "$T_s$." The oxygen desorption speed at 220° C. "$DTG_{220}$" was an oxygen desorption speed obtained by specifying the temperature "220° C." as a temperature at which rapid desorption of oxygen started.

<Coin Cell Assembled by Using Positive Electrode Active Material Particles>

In this specification, a coin cell having 2032 size was assembled by using a positive electrode containing the positive electrode active material particles, a negative electrode, and an electrolytic solution, which were manufactured in accordance with the following procedures, respectively.

(Positive Electrode)

By using acetylene black and graphite (acetylene black:graphite=1:1 (weight ratio)) as the conductive agent and polyvinylidene fluoride as the binder, the positive electrode active material particles, the conductive agent, and the binder (positive electrode active material particles:conductive agent:binder=90:6:4 (weight ratio)) were blended with each other, mixed with N-methylpyrrolidone to give a mixture, and metallic aluminum foil was coated with the mixture. The coated aluminum foil was dried at 110° C. to give a sheet. A sample sheet having a diameter of 15 mm was stamped out from the sheet and crimped under 3 t/cm$^2$ to give a positive electrode.

(Negative Electrode)

A sample sheet having a diameter of 16 mm was stamped out from metallic lithium foil to give a negative electrode having a thickness of 500 μm.

(Electrolytic Solution)

A mixture solvent of EC and DMC (EC:DMC=1:2 (volume ratio)) was prepared, and 1 mol/L of $LiPF_6$ as the electrolyte was dissolved in the mixture solution to give an electrolytic solution.

<Initial Charge/Discharge Capacity and Initial Charge/Discharge Efficiency of Non-Aqueous Electrolyte Secondary Battery>

The coin cell assembled in accordance with the above-mentioned method was subjected to initial charge (cc-cv) at a current density of 0.2 C rate with a voltage from 3.0V to 4.3V under an environment at 25° C. A capacity at this initial charge was indicated as an initial charge capacity (mAh/g).

After pausing for 5 minutes, the coin cell was subjected to discharge (cc) at a current density of 0.1 C rate with a voltage from 4.3V to 3.0V under the same environment as for the above initial charge, and an initial discharge capacity (mAh/g) was measured. An initial charge/discharge efficiency was calculated in accordance with the following equation.

Initial charge/discharge efficiency (%)=(Initial discharge capacity/Initial charge capacity)×100

<Cycle Property of Non-Aqueous Electrolyte Secondary Battery>

The coin cell assembled in accordance with the above-mentioned method was subjected to a charge/discharge cycle operation consisting of charge at a current density of 0.5 C rate with a voltage from 2.8V to 4.3V and discharge at a current density of 1.0 C rate with a voltage from 4.3V to 2.8V, respectively under an environment at 25° C. The charge/discharge cycle operation was repeated 100 times. Cycle property was calculated in accordance with the following equation.

Cycle property (%)=(Discharge capacity on 100$^{th}$ cycle/Discharge capacity on 1V cycle)×100

<Impedance Measurement of Non-Aqueous Electrolyte Secondary Battery Before/after Cycle Operation>

The coin cell assembled in accordance with the above-mentioned method was subjected to charge at a current density of 0.5 C rate with a voltage to 4.3V under an environment at 25° C. Then, impedance was measured under the following conditions, and a reaction resistance before cycle operation was calculated.
(Impedance Measurement Conditions)

| | |
|---|---|
| Impedance measurement apparatus: | "Solartron" 1400 type & FRA type 1470 commercially available from Solartron Metrology |
| Measurement environment: | 25° C. |
| Coin cell: | Half cell |
| Measurement voltage: | 4.3 V |
| Applied voltage: | 10 mV |
| Scan frequency: | 1M-0.01 Hz |

The coin cell which had been subjected to a test for the above-mentioned cycle property was subjected to charge at a current density of 0.5 C rate with a voltage to 4.3V. Then, impedance was measured under the same conditions mentioned above, and a reaction resistance after cycle operation was calculated. An increase ratio of a reaction resistance was calculated in accordance with the following equation.

Increase Ratio of Reaction Resistance(−)=Reaction resistance after cycle operation/Reaction resistance before cycle operation

Example 1

A nickel sulfate aqueous solution, a cobalt sulfate aqueous solution, and a magnesium sulfate aqueous solution were mixed with each other so that a molar ratio of Ni, Co, and Mg was adjusted to Ni:Co:Mg=89.0:8.5:0.5 to give a mixture solution (amount of Mg=Mg/(Ni+Co+Mg+Al)×100=0.5 mol %). Separately from the mixture solution, a sodium aluminate aqueous solution was prepared so that an amount of Al was Al/(Ni+Co+Mg+Al)×100=2.0 mol %. In a reaction vessel was previously prepared 10 L of pure water as a mother liquor, containing 300 g of a sodium hydroxide aqueous solution and 500 g of an ammonia solution as an alkaline solution. An inner part of the reaction vessel was $N_2$ purged by using $N_2$ gas at a flow rate of 0.7 L/min. The inner part was $N_2$ purged also during the reaction.

Then, the mixture solution, the sodium aluminate aqueous solution, the sodium hydroxide aqueous solution, and the ammonia solution were dropped simultaneously at a prescribed speed with rotating agitating blades at 1000 rpm. By a wet type reaction in which a dropping amount of the alkaline solution was adjusted so that pH of a reaction system was 12.5, the reaction system was coprecipitated so that agglomerated particles were formed by crystallization of Ni, Co, Mg, and Al. As a result, a precursor compound was synthesized.

The synthesized precursor compound was washed with water and dried at 110° C. for 12 hours under an atmospheric environment. Then, lithium hydroxide monohydrate and the precursor compound were weighted so that a molar ratio of Li to the total amount of Ni, Co, Mg, and Al was adjusted to Li/(Ni+Co+Mg+Al)=1.02, and they were mixed with each other in a mixer to give a mixture. The mixture was subjected to calcination under an atmosphere in an oxygen concentration of 95 vol % at a calcination maximum temperature of 750° C. for 12 hours, in total, in an electric furnace to give the positive electrode active material particles consisting of the layered lithium-composite oxide.

Example 2

Positive electrode active material particles consisting of the layered lithium-composite oxide were produced in the same manner as in Example 1 except for the following procedures. That is, a nickel sulfate aqueous solution, a cobalt sulfate aqueous solution, and a magnesium sulfate aqueous solution were mixed with each other so that a molar ratio of Ni, Co, and Mg was adjusted to Ni:Co:Mg=89.0:8.2:0.8 to give a mixture solution (amount of Mg=Mg/(Ni+Co+Mg+Al)×100=0.8 mol %). Separately from the mixture solution, a sodium aluminate aqueous solution was prepared so that an amount of Al was Al/(Ni+Co+Mg+Al)×100=2.0 mol %. By using these mixture solution and sodium aluminate aqueous solution, a wet type reaction was performed under the same conditions as in Example 1 to synthesize a precursor compound.

Example 3

Positive electrode active material particles consisting of the layered lithium-composite oxide were produced in the same manner as in Example 1 except for the following procedures. That is, a nickel sulfate aqueous solution, a cobalt sulfate aqueous solution, and a magnesium sulfate aqueous solution were mixed with each other so that a molar ratio of Ni, Co, and Mg was adjusted to Ni:Co:Mg=89.0:8.0:1.0 to give a mixture solution (amount of Mg=Mg/(Ni+Co+Mg+Al)×100=1.0 mol %). Separately from the mixture solution, a sodium aluminate aqueous solution was prepared so that an amount of Al was Al/(Ni+Co+Mg+Al)×100=2.0 mol %. By using these mixture solution and sodium aluminate aqueous solution, a wet type reaction was performed under the same conditions as in Example 1 to synthesize a precursor compound.

Example 4

Positive electrode active material particles consisting of the layered lithium-composite oxide were produced in the same manner as in Example 1 except for the following procedures. That is, a nickel sulfate aqueous solution, a cobalt sulfate aqueous solution, and a magnesium sulfate aqueous solution were mixed with each other so that a molar ratio of Ni, Co, and Mg was adjusted to Ni:Co:Mg=89.0:8.0:1.0 to give a mixture solution (amount of Mg=Mg/(Ni+Co+Mg+Al)×100=1.0 mol %). Separately from the mixture solution, a sodium aluminate aqueous solution was prepared so that an amount of Al was Al/(Ni+Co+Mg+Al)×100=2.0 mol %. By using these mixture solution and sodium aluminate aqueous solution, a wet type reaction was performed under the same conditions as in Example 1 to synthesize a precursor compound. By using this precursor compound, calcination was performed in the same manner as in Example 1 except that the calcination maximum temperature was changed to 730° C.

Example 5

A nickel sulfate aqueous solution and a cobalt sulfate aqueous solution were mixed with each other in each prescribed amount to give a mixture solution. Separately from the mixture solution, a sodium aluminate aqueous solution was prepared so that an amount of Al was Al/(Ni+Co+Zn+Al)×100=2.0 mol % in consideration of an amount of Zn which would be finally introduced thereinto. In a reaction vessel was previously prepared 10 L of pure water as a mother liquor, containing 300 g of a sodium hydroxide aqueous solution and 500 g of an ammonia solution as an alkaline solution. An inner part of the reaction vessel was $N_2$ purged by using N₂ gas at a flow rate of 0.7 L/min. The inner part was N₂ purged also during the reaction.

Then, the mixture solution, the sodium aluminate aqueous solution, the sodium hydroxide aqueous solution, and the ammonia solution were dropped simultaneously at a prescribed speed with rotating agitating blades at 1000 rpm. By a wet type reaction in which a dropping amount of the alkaline solution was adjusted so that pH of a reaction system was 12.5, the reaction system was coprecipitated so that agglomerated particles were formed by crystallization of Ni, Co, and Al. As a result, a precursor compound was synthesized.

The synthesized precursor compound was washed with water and dried at 110° C. for 12 hours under an atmospheric environment. Then, lithium hydroxide monohydrate, the precursor compound, and zinc oxide (ZnO) were weighted so that a molar ratio of Li to the total amount of Ni, Co, Zn, and Al was adjusted to Li/(Ni+Co+Zn+Al)=1.02, and they were mixed with each other in a mixer to give a mixture (amount of Zn=Zn/(Ni+Co+Zn+Al)×100=0.1 mol %). The mixture was subjected to calcination under an atmosphere in an oxygen concentration of 95 vol % at a calcination maximum temperature of 750° C. for 12 hours in total in an electric furnace to give positive electrode active material particles consisting of the layered lithium-composite oxide.

Example 6

Positive electrode active material particles consisting of the layered lithium-composite oxide were produced in the same manner as in Example 5 except for the following procedures. That is, a nickel sulfate aqueous solution and a cobalt sulfate aqueous solution were mixed with each other in each prescribed amount to give a mixture solution. Separately from the mixture solution, a sodium aluminate aqueous solution was prepared so that an amount of Al was Al/(Ni+Co+Zn+Al)×100=2.0 mol % in consideration of an amount of Zn which would be finally introduced thereinto. By using the mixture solution and sodium aluminate aqueous solution, a wet type reaction was performed under the same conditions as in Example 5 to synthesize a precursor compound. Lithium hydroxide monohydrate, the precursor compound, and zinc oxide (ZnO) were weighted so that a molar ratio of Li to the total amount of Ni, Co, Zn, and Al was adjusted to Li/(Ni+Co+Zn+Al)=1.02, and they were mixed with each other in a mixer to give a mixture (amount of Zn=Zn/(Ni+Co+Zn+Al)×100=0.5 mol %).

Comparative Example 1

Positive electrode active material particles consisting of the layered lithium-composite oxide were produced in the same manner as in Example 1 except for the following procedures. That is, a precursor compound was synthesized by using: a mixture solution prepared by mixing a nickel sulfate aqueous solution and a cobalt sulfate aqueous solution with each other; and a sodium aluminate aqueous solution so that a molar ratio of Ni, Co, and Al was adjusted to Ni:Co:Al=89.0:9.0:2.0. Lithium hydroxide monohydrate and the precursor compound were weighted so that a molar ratio of Li to the total amount of Ni, Co, and Al was adjusted to Li/(Ni+Co+Al)=1.02, and they were mixed with each other in a mixer to give a mixture.

Comparative Example 2

Positive electrode active material particles consisting of the layered lithium-composite oxide were produced in the same manner as in Comparative Example 1 except that the calcination maximum temperature was changed to 730° C.

Comparative Example 3

Positive electrode active material particles consisting of the layered lithium-composite oxide were produced in the same manner as in Comparative Example 1 except that the calcination maximum temperature was changed to 710° C.

Example 7

A nickel sulfate aqueous solution, a cobalt sulfate aqueous solution, a manganese sulfate aqueous solution, and a magnesium sulfate aqueous solution were mixed with each other so that a molar ratio of Ni, Co, Mn, and Mg was adjusted to Ni:Co:Mn:Mg=85.0:9.9:5.0:0.1 to give a mixture solution. In a reaction vessel was previously prepared 10 L of pure water as a mother liquor, containing 300 g of a sodium hydroxide aqueous solution and 500 g of an ammonia solution as an alkaline solution. An inner part of the reaction vessel was N₂ purged by using N₂ gas at a flow rate of 0.7 L/min. The inner part was N₂ purged also during the reaction.

Then, the mixture solution, the sodium hydroxide aqueous solution, and the ammonia solution were dropped simultaneously at a prescribed speed with rotating agitating blades at 1000 rpm. By a wet type reaction in which a dropping amount of the alkaline solution was adjusted so that pH of a reaction system was 12.5, the reaction system was coprecipitated so that agglomerated particles were formed by crystallization of Ni, Co, Mn, and Mg. As a result, a precursor compound was synthesized.

The synthesized precursor compound was washed with water and dried at 110° C. for 12 hours under an atmospheric environment. Then, lithium hydroxide monohydrate and the precursor compound were weighted so that a molar ratio of Li to the total amount of Ni, Co, Mg, and Mn was adjusted to Li/(Ni+Co+Mg+Mn)=1.02, and they were mixed with each other in a mixer to give a mixture (amount of Mg=Mg/(Ni+Co+Mg+Mn)×100=0.1 mol %). The mixture was subjected to calcination under an atmosphere in an oxygen concentration of 95 vol % at a calcination maximum temperature of 740° C. for 12 hours, in total, in an electric furnace to give the positive electrode active material particles consisting of the layered lithium-composite oxide.

Example 8

Positive electrode active material particles consisting of the layered lithium-composite oxide were produced in the same manner as in Example 7 except for the following procedures. That is, a nickel sulfate aqueous solution, a cobalt sulfate aqueous solution, a manganese sulfate aqueous solution, and a magnesium sulfate aqueous solution were mixed with each other so that a molar ratio of Ni, Co, Mn, and Mg was adjusted to Ni:Co:Mn:Mg=85.0:9.5:5.0:0.5 to give a mixture solution. By using this mixture solution, a wet type reaction was performed under the same conditions as in Example 7 to synthesize a precursor compound. Lithium hydroxide monohydrate and the precursor compound were weighted so that a molar ratio of Li to the total amount of Ni, Co, Mg, and Mn was adjusted to Li/(Ni+Co+Mg+Mn)=1.02, and they were mixed with each other in a mixer to give a mixture (amount of Mg=Mg/(Ni+Co+Mg+Mn)×100=0.5 mol %).

Example 9

Positive electrode active material particles consisting of the layered lithium-composite oxide were produced in the same manner as in Example 7 except for the following procedures. That is, a nickel sulfate aqueous solution, a cobalt sulfate aqueous solution, a manganese sulfate aqueous solution, and a magnesium sulfate aqueous solution were mixed with each other so that a molar ratio of Ni, Co, Mn, and Mg was adjusted to Ni:Co:Mn:Mg=85.0:9.1:5.0:0.9 to give a mixture solution. By using this mixture solution, a wet type reaction was performed under the same conditions as in Example 7 to synthesize a precursor compound. Lithium hydroxide monohydrate and the precursor compound were weighted so that a molar ratio of Li to the total amount of Ni, Co, Mg, and Mn was adjusted to Li/(Ni+Co+Mg+Mn)=1.02, and they were mixed with each other in a mixer to give a mixture (amount of Mg=Mg/(Ni+Co+Mg+Mn)×100=0.9 mol %).

Comparative Example 4

Positive electrode active material particles consisting of the layered lithium-composite oxide were produced in the same manner as in Example 7 except for the following procedures. That is, a precursor compound was synthesized by using a mixture solution prepared by mixing a nickel sulfate aqueous solution, a cobalt sulfate aqueous solution, and a manganese sulfate aqueous solution with each other so that a molar ratio of Ni, Co, and Mn was adjusted to Ni:Co:Mn=85.0:10.0:5.0. Lithium hydroxide monohydrate and the precursor compound were weighted so that a molar ratio of Li to the total amount of Ni, Co, and Mn was adjusted to Li/(Ni+Co+Mn)=1.02, and they were mixed with each other in a mixer to give a mixture.

For the positive electrode active material particles produced in each of Examples 1 to 9 and Comparative Examples 1 to 4, there were obtained: the average secondary particle diameter (D50); the crystallite size; the length of a-axis and the length of c-axis of a crystal lattice; the ratio of the length of c-axis to the length of a-axis (c/a); the cation mixing amount; the oxygen desorption starting temperature "$T_s$"; the oxygen desorption speed at 220° C. "$DTG_{220}$"; the peak top temperature "$T_p$"; the oxygen desorption speed of peak top "$DTG_p$"; and the difference "$T_p-T_s$" between the peak top temperature "$T_p$" and the oxygen desorption starting temperature "$T_s$," in accordance with each method mentioned above. As battery properties of the non-aqueous electrolyte secondary battery in which as the positive electrode were used the positive electrode active material particles produced in each of Examples 1 to 9 and Comparative Examples 1 to 4, there were obtained: the initial charge capacity; the initial charge/discharge efficiency; the cycle property; and the increase ratio of reaction resistance based on the impedance measurement before/after cycle operation, in accordance with each method mentioned above. The results and the composition of positive electrode active material particles are shown in: Tables 1 to 3 for Examples 1 to 6 and Comparative Examples 1 to 3; and Tables 4 to 6 for Examples 7 to 9 and Comparative Example 4.

Figure 3:
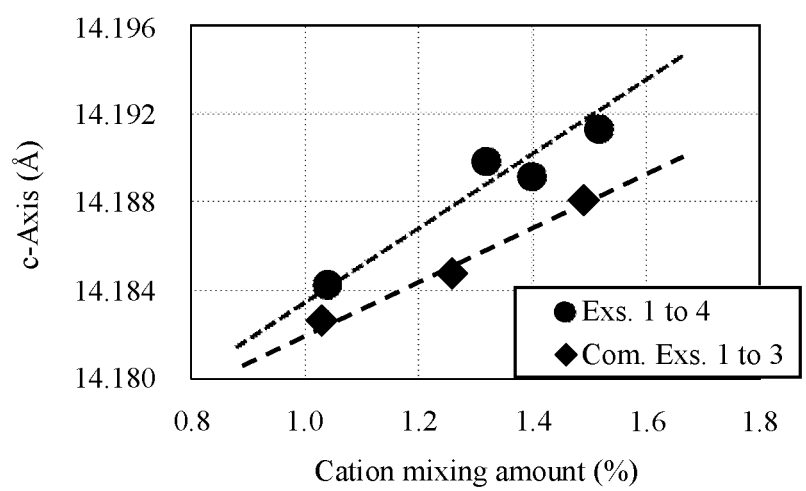
FIG. 3 shows a graph which represents a relationship of a cation mixing amount and a length of c-axis of a crystal lattice for the positive electrode active material particles in each of Examples 1 to 4 and Comparative Examples 1 to 3.

FIG. 1 shows the graph (DTG curve) based on the results of the thermogravimetry differential thermal analysis for the positive electrode active material particles produced in each of Example 1 and Comparative Example 1. In order to clarify the difference in reactivity between the positive electrode active material particles in Example 1 and the positive electrode active material particles in Comparative Example 1, FIG. 2 shows the graph made by enlarging the graph of which temperature range is 170-230° C. in FIG. 1. FIG. 3 shows the graph which represents the relationship of the cation mixing amount and the length of c-axis of a crystal lattice for the positive electrode active material particles produced in each of Examples 1 to 4 and Comparative Examples 1 to 3.

TABLE 1

Composition and producing condition of positive electrode active material particles

| | Ni amount[1] in 3b-site (mol %) | Co amount[1] in 3b-site (mol %) | Z Type | Z Amount[1] in 3b-site (mol %) | X Type | X Amount[1] (mol %) | X Timing of addition | Calcination temperature (° C.) |
|---|---|---|---|---|---|---|---|---|
| Ex. 1 | 89.0 | 8.5 | Al | 2.0 | Mg | 0.5 | At the time of synthesis of precursor compound | 750 |
| Ex. 2 | 89.0 | 8.2 | Al | 2.0 | Mg | 0.8 | At the time of synthesis of precursor compound | 750 |
| Ex. 3 | 89.0 | 8.0 | Al | 2.0 | Mg | 1.0 | At the time of synthesis of precursor compound | 750 |
| Ex. 4 | 89.0 | 8.0 | Al | 2.0 | Mg | 1.0 | At the time of synthesis of precursor compound | 730 |
| Ex. 5 | 89.0 | 8.9 | Al | 2.0 | Zn | 0.1 | At the time of mixing with Li compound | 750 |
| Ex. 6 | 89.0 | 8.5 | Al | 2.0 | Zn | 0.5 | At the time of mixing with Li compound | 750 |
| Com. Ex. 1 | 89.0 | 9.0 | Al | 2.0 | — | — | — | 750 |
| Com. Ex. 2 | 89.0 | 9.0 | Al | 2.0 | — | — | — | 730 |
| Com. Ex. 3 | 89.0 | 9.0 | Al | 2.0 | — | — | — | 710 |

[1]Amount relative to (Ni + Co + X + Z)

TABLE 2

Physical property of positive electrode active material particles

| | Average secondary particle diameter D50 (μm) | Result of Rietveld analysis | | | | |
|---|---|---|---|---|---|---|
| | | Crystallite size (nm) | Length of a-axis (Å) | Length of c-axis (Å) | c/a (—) | Cation mixing amount (%) |
| Ex. 1 | 5.4 | 339 | 2.8695 | 14.1842 | 4.943 | 1.0 |
| Ex. 2 | 5.6 | 333 | 2.8701 | 14.1891 | 4.944 | 1.4 |
| Ex. 3 | 5.8 | 331 | 2.8705 | 14.1913 | 4.944 | 1.5 |
| Ex. 4 | 6.2 | 314 | 2.8698 | 14.1898 | 4.945 | 1.3 |
| Ex. 5 | 5.0 | 385 | 2.8699 | 14.1899 | 4.944 | 0.9 |
| Ex. 6 | 4.8 | 383 | 2.8711 | 14.1922 | 4.943 | 1.1 |
| Com. Ex. 1 | 5.1 | 351 | 2.8690 | 14.1827 | 4.943 | 1.0 |
| Com. Ex. 2 | 5.8 | 225 | 2.8696 | 14.1848 | 4.943 | 1.3 |
| Com. Ex. 3 | 5.5 | 187 | 2.8697 | 14.1881 | 4.944 | 1.5 |

Physical property of positive electrode active material particles
Result of thermogravimetry differential thermal analysis

| | Oxygen desorption starting temperature $T_S$ (° C.) | Oxygen desorption speed at 220° C. $DTG_{220}$ (%/min.) | Peak top temperature $T_P$ (° C.) | Oxygen desorption speed of peak top $DTG_P$ (%/min.) | $T_P - T_S$ (° C.) |
|---|---|---|---|---|---|
| Ex. 1 | 187 | 0.24 | 230 | 1.63 | 43 |
| Ex. 2 | 186 | 0.22 | 231 | 1.75 | 45 |
| Ex. 3 | 185 | 0.21 | 232 | 1.95 | 46 |
| Ex. 4 | 191 | 0.19 | 231 | 1.38 | 40 |
| Ex. 5 | 190 | 0.25 | 230 | 2.50 | 32 |
| Ex. 6 | 189 | 0.24 | 227 | 1.70 | 32 |
| Com. Ex. 1 | 171 | 0.44 | 228 | 1.09 | 57 |
| Com. Ex. 2 | 175 | 0.36 | 230 | 1.60 | 55 |
| Com. Ex. 3 | 178 | 0.28 | 227 | 1.00 | 53 |

TABLE 3

Battery property of non-aqueous electrolyte secondary battery

| | Initial charge capacity (mAh/g) | Initial charge/discharge efficiency (%) | Cycle property (%) | Increase ratio of reaction resistance (—) |
|---|---|---|---|---|
| Ex. 1 | 234 | 90 | 82.4 | 12.8 |
| Ex. 2 | 233 | 89 | 82.3 | 16.5 |
| Ex. 3 | 234 | 90 | — | — |
| Ex. 4 | 231 | 89 | — | — |
| Ex. 5 | 233 | 89 | — | — |
| Ex. 6 | 231 | 89 | — | — |
| Com. Ex. 1 | 234 | 91 | 78.2 | 22.8 |
| Com. Ex. 2 | 234 | 90 | — | — |
| Com. Ex. 3 | 235 | 90 | — | — |

As shown in Tables 1 to 3, the positive electrode active material particles of Examples 1 to 3 and 5 to 6 each have a-axis and c-axis of a crystal lattice therein, which are approximately the same as or longer than those of the positive electrode active material particles of Comparative Example 1. The positive electrode active material particles of Example 4 have a-axis and c-axis of a crystal lattice therein, which are longer than those of the positive electrode active material particles of Comparative Example 2. These phenomena are caused by substitution with Mg or Zn which is the divalent metallic element. Although a-axis and c-axis become to be long, the ratio "c/a" is an approximately fixed value, i.e., 4.94-4.95.

From FIG. 3, it is conceived for cation mixing of the metallic elements to Li-site: Mg capable of substituting mainly acts while a small amount of Ni acts in the positive electrode active material particles each of Examples 1 to 4; and only divalent Ni mainly acts in the positive electrode active material particles each of Comparative Examples 1 to 3. It is considered Mg which has been used for substitution of a part of Li-site can stably exist in Li-site because an ionic radius of Mg ion is close to an ionic radius of Li ion and, as a result, crystal structure and thermal stability of a crystal lattice substituted with Mg are more stable than those of a crystal lattice substituted with Ni.

As shown in Tables 1 to 3, there is not much difference in the peak top temperature "$T_p$" between the positive electrode active material particles each of Examples 1 to 6 and the positive electrode active material particles each of Comparative Examples 1 to 3. Thus, it is supposed thermal stability of the positive electrode active material particles is whether the value "DTG", i.e., the oxygen desorption speed, within the temperature range from the oxygen desorption starting temperature "$T_s$" to the peak top temperature "$T_p$" is high or low. From Table 2 and FIG. 1, the oxygen desorption starting temperature "$T_s$" of the positive electrode active material particles of Example 1 shifts toward a high temperature side by about 10° C. because of substitution with divalent Mg for Li-site in comparison with the positive electrode active material particles in which there is no substitution with Mg of Comparative Example 1. It is understood the oxygen desorption speed over 200° C. of the positive electrode active material particles in which there is no substitution with Mg of Comparative Example 1 is steeper than that of the positive electrode active material particles of Example 1. It is considered because electrostatic Mg—O bonding in the positive electrode active material particles of Example 1 becomes to be strong by substitution with Mg and, in general, MgO has a high melting point and shows excellent stability, the positive electrode active material particles in which there is substitution with Mg hardly occur thermal decomposition due to release of oxygen and, as a result, structural stability and battery properties can be improved.

As shown in FIG. 2, it is understood the oxygen desorption speed of the positive electrode active material particles of Comparative Example 1 is higher than that of the positive electrode active material particles of Example 1 at 220° C. lower than around 225° C. at which desorption of oxygen becomes to be remarkable and the positive electrode active material particles of Comparative Example 1 show thermal stability inferior to the positive electrode active material particles of Example 1 at the same temperature. Therefore, it is suggested structural disorder of crystal is progressing in the positive electrode active material particles of Comparative Example 1.

The following are also understood from Table 3. That is, in the positive electrode active material particles each of Examples 1 to 6, although Li-site is substituted with divalent Mg or Zn, an amount of divalent Mg or Zn used for substitution is small. Therefore, the positive electrode active material particles each of Examples 1 to 6 show cycle property which is superior to that of the positive electrode active material particles each of Comparative Examples 1 to 3 with having excellent initial charge capacity and initial charge/discharge efficiency which are approximately equivalent to those of the positive electrode active material particles each of Comparative Examples 1 to 3, and also show very little reaction resistance increase due to the cycle operation.

From these results, it is considered, as important points in the present invention, "structural stability" which is said to improve cycle property means smallness of structural disorder of crystal during repeating removal/insertion of Li when the positive electrode active material particles are used for batteries, and this smallness indicates high performance of the positive electrode active material particles when the positive electrode active material particles are used for batteries. It is also considered "thermal stability" which is based on lowness of the oxygen desorption speed up to high temperature indicates the phenomenon such that a temperature at which the positive electrode active material particles disintegrate becomes to be high even if the positive electrode active material particles having an unstable structure from which Li is desorbed are externally heated, that is, the structure as the positive electrode active material particles becomes to be stable even when a temperature of the positive electrode active material particles is heightened.

In the true sense of stability for the structure in the positive electrode active material particles, the positive electrode active material particles are needed to have simultaneously: so-called dynamic structural stability in case the positive electrode active material particles are used for batteries as mentioned above; and so-called static structural stability which is measured by using a thermal analysis apparatus. The present invention could provide the positive electrode active material particles capable of meeting such needs. In addition, by substituting with a very small amount of the divalent metallic elements as in the present invention, excellent cycle property and low resistance can be achieved without lowering battery capacity in the present invention.

TABLE 4

Composition and producing condition of positive electrode active material particles

| | Ni amount[1] in 3b-site (mol %) | Co amount[1] in 3b-site (mol %) | Z Type | Amount[1] in 3b-site (mol %) | X Type | Amount[1] (mol %) | Timing of addition | Calcination temperature (° C.) |
|---|---|---|---|---|---|---|---|---|
| Ex. 7 | 85.0 | 9.9 | Mn | 5.0 | Mg | 0.1 | At the time of synthesis of precursor compound | 740 |
| Ex. 8 | 85.0 | 9.5 | Mn | 5.0 | Mg | 0.5 | At the time of synthesis of precursor compound | 740 |
| Ex. 9 | 85.0 | 9.1 | Mn | 5.0 | Mg | 0.9 | At the time of synthesis of precursor compound | 740 |
| Com. Ex. 4 | 85.0 | 10.0 | Mn | 5.0 | — | — | — | 740 |

[1]Amount relative to (Ni + Co + X + Z)

TABLE 5

Physical property of positive electrode active material particles

| | Average secondary particle diameter D50 (μm) | Result of Rietveld analysis | | | | |
|---|---|---|---|---|---|---|
| | | Crystallite size (nm) | Length of a-axis (Å) | Length of c-axis (Å) | c/a (—) | Cation mixing amount (%) |
| Ex. 7 | 5.5 | 60 | 2.8727 | 14.1940 | 4.941 | 1.9 |
| Ex. 8 | 5.6 | 65 | 2.8728 | 14.1945 | 4.941 | 2.0 |
| Ex. 9 | 5.6 | 60 | 2.8730 | 14.1953 | 4.941 | 2.2 |
| Com. Ex. 4 | 5.5 | 60 | 2.8726 | 14.1935 | 4.941 | 1.8 |

TABLE 5-continued

| | Physical property of positive electrode active material particles Result of thermogravimetry differential thermal analysis | | | | |
|---|---|---|---|---|---|
| | Oxygen desorption starting temperature $T_S$ (° C.) | Oxygen desorption speed at 220° C. $DTG_{220}$ (%/min.) | Peak top temperature $T_P$ (° C.) | Oxygen desorption speed of peak top $DTG_P$ (%/min.) | $T_P - T_S$ (° C.) |
| Ex. 7 | 177 | 0.71 | 218 | 0.72 | 41 |
| Ex. 8 | 185 | 0.69 | 224 | 0.87 | 39 |
| Ex. 9 | 180 | 0.53 | 225 | 0.86 | 45 |
| Com. Ex. 4 | 175 | 0.82 | 217 | 0.98 | 42 |

TABLE 6

| | Battery property of non-aqueous electrolyte secondary battery | | | |
|---|---|---|---|---|
| | Initial charge capacity (mAh/g) | Initial charge/discharge efficiency (%) | Cycle property (%) | Increase ratio of reaction resistance (—) |
| Ex. 7 | 228 | 88 | 91.4 | 11.1 |
| Ex. 8 | 227 | 88 | 92.2 | — |
| Ex. 9 | 226 | 87 | 93.1 | — |
| Com. Ex. 4 | 230 | 89 | 89.3 | 19.2 |

As shown in Tables 4 to 6, the positive electrode active material particles of Examples 7 to 9 each have a-axis and c-axis of a crystal lattice therein, which are approximately same as or longer than those of the positive electrode active material particles of Comparative Example 4. This phenomenon is caused by substitution with Mg which is the divalent metallic element. Although a-axis and c-axis become to be long, the ratio "c/a" is a fixed value, i.e., about 4.94.

As shown in Tables 4 to 6, there is not much difference in the peak top temperature "$T_p$" between the positive electrode active material particles each of Examples 7 to 9 and the positive electrode active material particles of Comparative Example 4. Thus, it is supposed thermal stability of the positive electrode active material particles is whether the value "DTG", i.e., the oxygen desorption speed, within the temperature range from the oxygen desorption starting temperature "$T_s$" to the peak top temperature "$T_p$" is high or low.

The following are also understood from Table 6. That is, in the positive electrode active material particles each of Examples 7 to 9, although Li-site is substituted with divalent Mg, an amount of divalent Mg used for substitution is small. Therefore, the positive electrode active material particles each of Examples 7 to 9 show cycle property which is superior to that of the positive electrode active material particles of Comparative Example 4 with having excellent initial charge capacity and initial charge/discharge efficiency which are approximately equivalent to those of the positive electrode active material particles of Comparative Example 4, and also show very little reaction resistance increase due to the cycle operation.

The positive electrode active material particles according to the present invention have a high capacity because of Ni in a large amount, and show excellent thermal stability in addition to not only excellent structural stability, but also little resistance increase and excellent cycle property with maintaining a sufficient battery capacity. Therefore, the positive electrode active material particles according to the present invention are suitable as positive electrode active materials for non-aqueous electrolyte secondary batteries.

As described above, embodiments have been described as examples of art in the present invention. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present invention, it is understood that various modifications, replacements, additions, omissions, and the like can be performed in the scope of the claims or in an equivalent scope thereof.

What is claimed is:

1. Positive electrode active material particles for non-aqueous electrolyte secondary batteries, having a layered rock salt structure, comprising particles represented by the compositional formula:

$(Li_yX_e)(Ni_aCo_bX_cZ_d)O_2$ in the compositional formula: X is a divalent metallic element which substitutes for both Li-site and Metal-site, and X is Mg and/or Zn; Z is a metallic element other than X, Z is at least one selected from the group consisting of Al, Mn, Ti, V, Fe, Ga, Sr, Y, Zr, Nb, Mo, Ru, In, Sn, Ta, W and Bi, and Z contains at least Al and/or Mn; $0.93 \leq y \leq 1.15$; $0.82 \leq a < 1.00$; $0 \leq b \leq 0.12$; $0.001 \leq c+e \leq 0.040$; $0 \leq d \leq 0.10$; and $a+b+c+d=1$.

2. A method for producing the positive electrode active material particles according to claim 1, which are represented by the compositional formula:

$(Li_yX_e)(Ni_aCo_bX_cZ_d)O_2$ in the compositional formula: X is a divalent metallic element which substitutes for both Li-site and Metal-site, and X is Mg and/or Zn; Z is a metallic element, other than X, Z is at least one selected from the group consisting of Al, Mn, Ti, V, Fe, Ga, Sr, Y, Zr, Nb, Mo, Ru, In, Sn, Ta, W and Bi, and Z contains at least Al and/or Mn; $0.93 \leq y \leq 1.15$; $0.82 \leq a < 1.00$; $0 \leq b \leq 0.12$; $0.001 \leq c+e \leq 0.040$; $0 \leq d \leq 0.10$; and $a+b+c+d=1$, comprising:

a step (I) including in this order
  synthesizing of a precursor compound by coprecipitating
    an aqueous solution containing an aqueous solution of a nickel compound, an optional aqueous solution of a cobalt compound, and an optional aqueous solution of a metallic element Z compound, and an aqueous solution of a divalent metallic element X compound, the divalent metallic element X substituting for both Li-site and Metal-site in a wet type reaction by using an alkaline aqueous solution, washing with water and drying of the precursor compound, mixing of a lithium compound and the precursor compound at a prescribed ratio to prepare a mixture, and calcinating of the mixture under an oxidizing atmosphere at 650-850° C. to prepare a layered lithium-composite oxide; or a step (II) including in this order synthesizing of a precursor compound by coprecipitating an aqueous solution containing an aqueous solution of a nickel compound, an optional aqueous solution of a cobalt compound, and an optional aqueous solution of a metallic element Z compound in a wet type reaction by using an alkaline aqueous solution, washing with water and drying of the precursor compound, mixing of a lithium compound, the precursor compound, and a divalent metallic element X compound substituting for both Li-site and Metal-site, at a prescribed ratio to prepare a mixture, and calcinating of the mixture under an oxidizing atmosphere at 650-850° C. to prepare a layered lithium-composite oxide, wherein when the step (I) or the step (II) is performed, an amount of the divalent metallic element X which substitutes for both Li-site and Metal-site is adjusted to 0.1-4.0 mol % relative to a total amount of Ni, optional Co, the divalent metallic element X, and an optional metallic element Z.

3. A non-aqueous electrolyte secondary battery comprising a positive electrode containing the positive electrode active material particles according to claim 1.

* * * * *